US010818887B2

(12) United States Patent
Makabe et al.

(10) Patent No.: US 10,818,887 B2
(45) Date of Patent: Oct. 27, 2020

(54) POWER STORAGE DEVICE, CASING SEALING STRUCTURE, AND CASING MANUFACTURING METHOD

(71) Applicants: HONDA MOTOR CO., LTD., Minato-ku, Tokyo (JP); ELIIY Power Co., Ltd, Shinagawa-ku, Tokyo (JP)

(72) Inventors: Tomoya Makabe, Wako (JP); Takeshi Yanagisawa, Wako (JP); Hiroyuki Suzuki, Wako (JP); Masaharu Nakamori, Wako (JP); Hideyuki Sugiyama, Tokyo (JP); Hiroshi Sato, Tokyo (JP); Takeshi Sawada, Tokyo (JP); Kazutoshi Miyauchi, Tokyo (JP)

(73) Assignees: Honda Motor Co., Ltd., Tokyo (JP); ELIIY Power Co., Ltd., Tokyo (JP)

( * ) Notice: Subject to any disclaimer, the term of this patent is extended or adjusted under 35 U.S.C. 154(b) by 26 days.

(21) Appl. No.: 16/064,005

(22) PCT Filed: Dec. 28, 2015

(86) PCT No.: PCT/JP2015/086476
§ 371 (c)(1),
(2) Date: Jun. 20, 2018

(87) PCT Pub. No.: WO2017/115404
PCT Pub. Date: Jul. 6, 2017

(65) Prior Publication Data
US 2018/0375068 A1 Dec. 27, 2018

(51) Int. Cl.
*H01M 2/04* (2006.01)
*H01M 2/08* (2006.01)
(Continued)

(52) U.S. Cl.
CPC ......... *H01M 2/0434* (2013.01); *H01M 2/024* (2013.01); *H01M 2/0439* (2013.01);
(Continued)

(58) Field of Classification Search
CPC .............................. H01M 2/0434; H01M 2/04
See application file for complete search history.

(56) References Cited

U.S. PATENT DOCUMENTS

| 2003/0211382 | A1 | 11/2003 | Aoyama | |
| 2006/0016633 | A1* | 1/2006 | Fujii | B60R 16/04 180/68.5 |
| 2014/0093765 | A1 | 4/2014 | Kusunoki | |

FOREIGN PATENT DOCUMENTS

| CN | 1305142 | 3/2007 |
| CN | 104704674 | 6/2015 |

(Continued)

OTHER PUBLICATIONS

International Search Report and Written Opinion for International Patent Application No. PCT/JP2015/086476 dated Feb. 9, 2016, 11 pages.

(Continued)

*Primary Examiner* — Olatunji A Godo
(74) *Attorney, Agent, or Firm* — Amin, Turocy & Watson, LLP

(57) ABSTRACT

The present invention provides a power storage device capable of preventing deterioration of sealability even when a pulling force is applied to a casing and having high safety and excellent durability. The power storage device of the present invention includes a casing having a sealing structure, the casing includes a first member including a first opening and a second member, the first and second members are joined to each other at a first joint portion provided at a peripheral edge of the first opening, the first joint portion includes a first peripheral groove portion and a first recep- (Continued)

tion port provided at one of the first and second members, a first convex edge portion provided at the other thereof, a first claw portion provided on a side surface of the first convex edge portion, and a first adhesive layer, a front end of the first convex edge portion is disposed inside the first peripheral groove portion and is bonded to an inner wall of the first peripheral groove portion by the first adhesive layer, the first claw portion is disposed inside the first reception port, and the first adhesive layer bonds the front end of the first convex edge portion to the inner wall of the first peripheral groove portion in a state where a side surface of the first claw portion opposite to the front end of the first convex edge portion is in contact with an inner wall of the first reception port opposite to a bottom of the first peripheral groove portion.

15 Claims, 8 Drawing Sheets

(51) Int. Cl.
*H01M 2/10* (2006.01)
*H01M 2/02* (2006.01)

(52) U.S. Cl.
CPC ............... *H01M 2/08* (2013.01); *H01M 2/10* (2013.01); *H01M 2/1077* (2013.01); *H01M 2/1072* (2013.01); *H01M 2250/20* (2013.01)

(56) References Cited

FOREIGN PATENT DOCUMENTS

| | | |
|---|---|---|
| CN | 104995761 | 10/2015 |
| CN | 204885299 | 12/2015 |
| DE | 2036158 | 2/1971 |
| JP | 2000-294212 | 10/2000 |
| JP | 2003-257388 | 9/2003 |
| JP | 2005-232420 | 9/2005 |
| JP | 2007-103284 | 4/2007 |
| JP | 2015-008121 | 1/2015 |
| JP | 2015-122335 | 2/2015 |

OTHER PUBLICATIONS

Extended European Search Report for European Patent Application No. 15912070.8 dated Dec. 21, 2018.
Chinese Office Action for Chinese Patent Application No. 201580085451.2 dated Jun. 15, 2020.

* cited by examiner

POWER STORAGE DEVICE, CASING SEALING STRUCTURE, AND CASING MANUFACTURING METHOD

TECHNICAL FIELD

The present invention relates to a power storage device, a casing sealing structure, and a casing manufacturing method.

BACKGROUND ART

In recent years, batteries have been used for various purposes, and particularly, batteries having large capacities have been used to supply electric power to electric vehicle and a power storage device.

When a battery is used as a single cell, a voltage of the battery is lower than a voltage necessary for a device in some cases. In such a case, there is a need to increase a supply voltage to a desired voltage by connecting a plurality of batteries to each other in series. Further, a single cell cannot sufficiently supply an electric power amount necessary for a device in some cases. In such a case, there is a need to increase a supply electric power amount to a desired amount by connecting a plurality of batteries to each other in parallel.

For this reason, electric power is supplied from a power storage device in which a plurality of batteries connected to each other in series or in parallel are accommodated in a casing to a device. Further, a power storage device including a casing keeping airtightness is known (for example, see Patent Document 1). Since the casing keeps airtightness, it is possible to prevent rain or dust from intruding into the casing and to improve the safety of the power storage device. Further, it is possible to improve the durability of the power storage device.

Meanwhile, a method of forming a sealing structure in which a protruding front end of a peripheral edge portion of an upper casing is bonded to a groove portion of a peripheral edge portion of a lower casing by an adhesive is known (for example, see Patent Document 2). Further, in this sealing structure, a circuit board and the upper casing are connected to each other by a snap-fit structure so that the position of the upper casing is fixed by the lower casing. The snap-fit structure is a structure in which two members are mechanically connected to each other by fitting and hooking a claw portion (a holding portion) to a concave portion using the elasticity of a material. Additionally, in the snap-fit structure, since the claw portion is hooked to the concave portion by using the elasticity of the material, a gap (an allowance) is generally formed between an inner surface of the concave portion and an upper surface of the claw portion.

RELATED ART DOCUMENT

Patent Document

Patent Document 1: Japanese Unexamined Patent Application, First Publication No. 2015-008121
Patent Document 2: Japanese Unexamined Patent Application, First Publication No. 2005-232420

SUMMARY

Problems to be Solved by the Invention

In the conventional sealing structure in which two components are connected to each other by the adhesive and the snap-fit structure, a gap is formed between the claw portion and the concave portion of the snap-fit structure. For this reason, when a pulling force is applied to the sealing structure, a portion bonded by the adhesive is peeled and thus the sealability of the sealing structure deteriorates in some cases.

The present invention has been made in view of such circumstances and an object of the present invention is to provide a power storage device capable of preventing deterioration of sealability even when a pulling force is applied to a casing and having high safety and excellent durability.

Means for Solving the Problem

The present invention provides a power storage device including: a battery; and a casing which accommodates the battery and has a sealing structure, wherein the casing includes a first member accommodating the battery and including a first opening and a second member covering the first opening, wherein the first and second members are joined to each other at a first joint portion provided at a peripheral edge of the first opening, wherein the first joint portion includes a first peripheral groove portion and a first reception port provided at one of the first and second members, a first convex edge portion provided at the other thereof, a first claw portion provided on a side surface of the first convex edge portion, and a first adhesive layer disposed inside the first peripheral groove portion, wherein a front end of the first convex edge portion is disposed inside the first peripheral groove portion and is bonded to an inner wall of the first peripheral groove portion by the first adhesive layer, wherein the first claw portion is disposed inside the first reception port, and wherein the first adhesive layer bonds the front end of the first convex edge portion to the inner wall of the first peripheral groove portion in a state in which a side surface of the first claw portion opposite to the front end of the first convex edge portion is in contact with an inner wall of the first reception port opposite to a bottom of the first peripheral groove portion.

Advantage of the Invention

Since the power storage device of the present invention includes the battery and the casing accommodating the battery and having the sealing structure, it is possible to prevent rain or dust from intruding into the casing.

Since the casing included in the power storage device of the present invention includes the first member accommodating the battery and including the first opening and the second member covering the first opening, it is possible to insert the battery from the first opening into the first member at the time of manufacturing and to cover the first opening with the second member.

Since the first and second members constituting the casing are joined to each other at the first joint portion provided at the peripheral edge of the first opening, it is possible to join the first member and the second member to each other without forming a gap therebetween.

Since the front end of the first convex edge portion provided at one of the first and second members is disposed inside the first peripheral groove portion provided at the other thereof and is bonded to the inner wall of the first peripheral groove portion by the first adhesive layer disposed inside the first peripheral groove portion, it is possible to join the first member and the second member to each other without forming a gap therebetween.

The first peripheral groove portion and the first reception port are provided at one of the first and second members and the first convex edge portion and the first claw portion are provided at the other thereof. Further, the first claw portion is disposed inside the first reception port and the first adhesive layer bonds the front end of the first convex edge portion to the inner wall of the first peripheral groove portion in a state in which the side surface of the first claw portion opposite to the front end of the first convex edge portion is in contact with the inner wall of the first reception port opposite to the bottom of the first peripheral groove portion. For this reason, when a pulling force is applied to the first member and the second member, a contact portion between the first claw portion and the first reception port serves as a stopper. Thus, it is possible to prevent a large pulling stress from being generated in a portion bonded by the first adhesive layer. Accordingly, since it is possible to prevent the peeling of the first adhesive layer, it is possible to prevent deterioration of sealability of the casing. As a result, it is possible to improve the safety and the durability of the power storage device.

Since the first claw portion is provided on the side surface of the first convex edge portion, it is possible to provide the first claw portion and the first reception port on the side wall of the casing and thus to decrease the size of the power storage device. Further, since it is possible to provide the plurality of first claw portions on the side surface of the first convex edge portion, it is possible to entirely prevent a large pulling stress from being generated at a portion bonded by the first adhesive layer.

DESCRIPTION OF THE EMBODIMENTS

Figure 1:
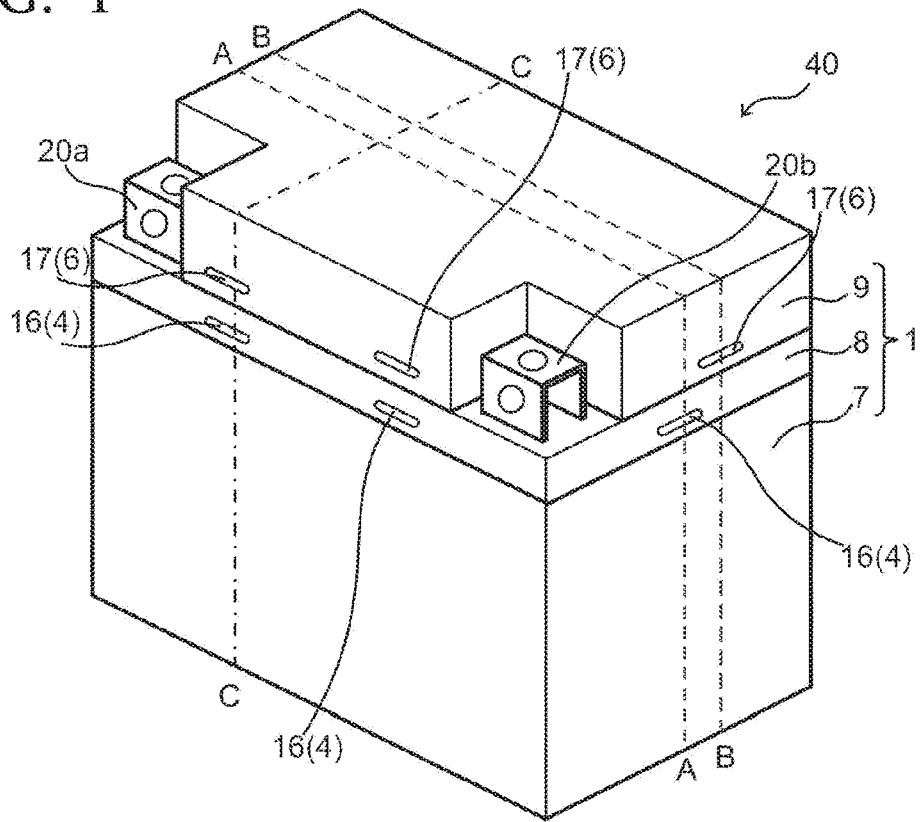
FIG. 1 is a schematic perspective view of a power storage device of a first embodiment of the present invention.

A power storage device of the present invention includes: a battery; and a casing which accommodates the battery and has a sealing structure, wherein the casing includes a first member accommodating the battery and including a first opening and a second member covering the first opening, wherein the first and second members are joined to each other at a first joint portion provided at a peripheral edge of the first opening, wherein the first joint portion includes a first peripheral groove portion and a first reception port provided at one of the first and second members, a first convex edge portion provided at the other thereof, a first claw portion provided on a side surface of the first convex edge portion, and a first adhesive layer disposed inside the first peripheral groove portion, wherein a front end of the first convex edge portion is disposed inside the first peripheral groove portion and is bonded to an inner wall of the first peripheral groove portion by the first adhesive layer, wherein the first claw portion is disposed inside the first reception port, and wherein the first adhesive layer bonds the front end of the first convex edge portion to the inner wall of the first peripheral groove portion in a state in which a side surface of the first claw portion opposite to the front end of the first convex edge portion is in contact with an inner wall of the first reception port opposite to a bottom of the first peripheral groove portion.

The first adhesive layer included in the power storage device of the present invention may bond the front end of the first convex edge portion to the inner wall of the first peripheral groove portion in a state in which the side surface of the first claw portion near the front end of the first convex edge portion is not in contact with the inner wall of the first reception port near the bottom of the first peripheral groove portion. Accordingly, since it is possible to easily dispose the first claw portion inside the first reception port at the time of manufacturing, it is possible to decrease a manufacturing cost.

The first claw portion included in the power storage device of the present invention may have a hook shape and engage with the first reception port by a snap-fit structure. Accordingly, since it is possible to easily dispose the first claw portion inside the first reception port at the time of manufacturing, it is possible to decrease a manufacturing cost.

In the power storage device of the present invention, the first reception port may be provided at a plurality of positions of one of the first and second members and the first claw portion may be provided at a plurality of positions of the other thereof. Further, each of the first claw portions may be disposed inside any one of the first reception ports among the plurality of first reception ports. Accordingly, it is possible to entirely prevent a large pulling stress from being generated at a portion bonded by the first adhesive layer.

In the power storage device of the present invention, the first reception port may be a slit-shaped through-hole. Accordingly, when the first member and the second member are combined with each other by the snap-fit structure, the first claw portion can be inserted into the first reception port by elastically deforming the side wall portion of the first reception port in an arch shape. Further, since it is possible to prevent the deformation of the first convex edge portion, it is possible to prevent the bending of the first convex edge portion. For this reason, it is possible to improve the strength of the casing.

The casing included in the power storage device of the present invention may further include a third member disposed on the second member and including a second opening. The second and third members may be joined to each other at a second joint portion provided at a peripheral edge of the second opening and the second joint portion may include a second peripheral groove portion and a second reception port provided at one of the second and third members, a second convex edge portion provided at the other thereof, a second claw portion provided on a side surface of the second convex edge portion, and a second adhesive layer disposed inside the second peripheral groove portion. Further, a front end of the second convex edge portion may be disposed inside the second peripheral groove portion and bonded to an inner wall of the second peripheral groove portion by the second adhesive layer and the second claw portion may be disposed inside the second reception port. Furthermore, the second adhesive layer may bond the front end of the second convex edge portion to the inner wall of the second peripheral groove portion in a state in which a side surface of the second claw portion opposite to the front end of the second convex edge portion is in contact with an inner wall of the second reception port opposite to a bottom of the second peripheral groove portion.

Accordingly, since it is possible to form the power storage device in a multi-layer structure, it is possible to easily provide the wire in the power storage device or to provide the battery monitoring portion therein. Further, the second joint portion between the second member and the third member can have the same structure as the first joint portion. Accordingly, since a contact portion between the second claw portion and the second reception port serves as a stopper when a pulling force is applied to the second member and the third member, it is possible to prevent a large pulling force from being generated at a portion bonded by the second adhesive layer. Accordingly, since it is possible to prevent the peeling of the second adhesive layer, it is possible to prevent deterioration of sealability of the casing. As a result, it is possible to improve the safety and the durability of the power storage device.

The second adhesive layer included in the power storage device of the present invention may bond the front end of the second convex edge portion to the inner wall of the second peripheral groove portion in a state in which the side surface of the second claw portion near the front end of the second convex edge portion is not in contact with the inner wall of the second reception port near the bottom of the second peripheral groove portion.

According to such a configuration, since it is possible to easily dispose the second claw portion inside the second reception port at the time of manufacturing, it is possible to decrease a manufacturing cost.

The power storage device of the present invention may further include a battery monitoring portion which monitors the battery and a wire which connects the battery to the battery monitoring portion. The battery monitoring portion may be disposed between the second member and the third member and the wire may be disposed on the second member.

According to such a configuration, since it is possible to dispose the battery monitoring portion inside the casing, it is possible to monitor the battery by the battery monitoring portion. Accordingly, it is possible to decrease the size of the power storage device. Further, it is possible to improve the safety of the power storage device.

The power storage device of the present invention may further include a protection casing which accommodates the battery monitoring portion.

According to such a configuration, since it is possible to protect the battery monitoring portion with the protection casing even when liquid leakage occurs in the battery inside the casing, it is possible to improve the safety of the power storage device.

The first member included in the power storage device of the present invention may accommodate a plurality of the batteries and the plurality of batteries may be connected to each other in series or in parallel. Accordingly, the power storage device of the present invention can supply electricity required by various devices.

The present invention also provides a power storage device including: a battery; and a casing which accommodates the battery and has a sealing structure, wherein the casing includes a first member accommodating the battery and including a first opening and a second member covering the first opening, wherein the first and second members are joined to each other at a first joint portion provided at a peripheral edge of the first opening, wherein the first joint portion includes a first peripheral groove portion and a first claw portion provided at one of the first and second members, a first convex edge portion provided at the other thereof, a first reception port provided at the first convex edge portion, and a first adhesive layer disposed inside the first peripheral groove portion, wherein a front end of the first convex edge portion is disposed inside the first peripheral groove portion and is bonded to an inner wall of the first peripheral groove portion by the first adhesive layer, wherein the first claw portion is disposed inside the first reception port, and wherein the first adhesive layer bonds the front end of the first convex edge portion to the inner wall of the first peripheral groove portion in a state in which an inner wall of the first reception port near the front end of the first convex edge portion is in contact with a side surface of the first claw portion near a bottom of the first peripheral groove portion.

In the power storage device of the present invention, the inner wall of the first reception port near the front end of the first convex edge portion and the side surface of the first claw portion near the bottom of the first peripheral groove portion can be joined to each other at the contact portion. For this reason, since the contact portion between the side surface of the first claw portion and the inner wall of the first reception port serves as a stopper when a pulling force is applied to the first member and the second member, it is possible to prevent a large pulling stress from being generated at a portion bonded by the first adhesive layer. Accordingly, since it is possible to prevent the peeling of the first adhesive layer, it is possible to prevent deterioration of sealability of the casing.

The casing included in the power storage device of the present invention may further include a third member disposed on the second member and including a second opening and the second and third members may be joined to each other at a second joint portion provided at a peripheral edge of the second opening. The second joint portion may include a second peripheral groove portion and a second claw portion provided at one of the second and third members, a second convex edge portion provided at the other thereof, a second reception port provided at the second convex edge portion, and a second adhesive layer disposed inside the second peripheral groove portion and a front end of the second convex edge portion may be disposed inside the second peripheral groove portion and may be bonded to an inner wall of the second peripheral groove portion by the second adhesive layer. The second claw portion may be disposed inside the second reception port and the second adhesive layer may bond the front end of the second convex edge portion to the inner wall of the second peripheral groove portion in a state in which an inner wall of the second reception port near the front end of the second convex edge portion is in contact with a side surface of the second claw portion near a bottom of the second peripheral groove portion.

Accordingly, the inner wall of the second reception port near the front end of the second convex edge portion and the side surface of the second claw portion near the bottom of the second peripheral groove portion can be joined to each other at the contact portion. For this reason, since the contact portion between the side surface of the second claw portion and the inner wall of the second reception port serves as a stopper when a pulling force is applied to the second member and the third member, it is possible to prevent a large pulling stress from being generated at a portion bonded by the second adhesive layer. Accordingly, since it is possible to prevent the peeling of the second adhesive layer, it is possible to prevent deterioration of sealability of the casing.

The present invention also provides a sealing structure of a casing, wherein the casing includes a first member including a first opening and a second member covering the first opening, wherein the first and second members are joined to each other at a first joint portion provided at a peripheral edge of the first opening, wherein the first joint portion includes a first peripheral groove portion and a first reception port provided at one of the first and second members, a first convex edge portion provided at the other thereof, a first claw portion provided on a side surface of the first convex edge portion, and a first adhesive layer disposed inside the first peripheral groove portion, wherein a front end of the first convex edge portion is disposed inside the first peripheral groove portion and is bonded to an inner wall of the first peripheral groove portion by the first adhesive layer, wherein the first claw portion is disposed inside the first reception port, and wherein the first adhesive layer bonds the front end of the first convex edge portion to the inner wall of the first peripheral groove portion in a state in which a side surface of the first claw portion opposite to the front end of the first convex edge portion is in contact with an inner wall of the first reception port opposite to a bottom of the first peripheral groove portion.

According to the casing sealing structure of the present invention, the first and second members can be joined to each other at the contact portion between the first claw portion and the first reception port. For this reason, since the contact portion between the first claw portion and the first reception port serves as a stopper when a pulling force is applied to the first member and the second member, it is possible to prevent a large pulling force from being generated at a portion bonded by the first adhesive layer. Accordingly, since it is possible to prevent the peeling of the first adhesive layer, it is possible to prevent deterioration of sealability of the casing.

The casing having the sealing structure of the present invention may further include a third member disposed on the second member and having a second opening. The second and third members may be joined to each other at a second joint portion provided at a peripheral edge of the second opening and the second joint portion may include a second peripheral groove portion and a second reception port provided at one of the second and third members, a second convex edge portion provided at the other thereof, a second claw portion provided on a side surface of the second convex edge portion, and a second adhesive layer disposed inside the second peripheral groove portion. Further, a front end of the second convex edge portion may be disposed inside the second peripheral groove portion and bonded to an inner wall of the second peripheral groove portion by the second adhesive layer and the second claw portion may be disposed inside the second reception port. Furthermore, the second adhesive layer may bond the front end of the second convex edge portion to the inner wall of the second peripheral groove portion in a state in which a side surface of the second claw portion opposite to the front end of the second convex edge portion is in contact with an inner wall of the second reception port opposite to a bottom of the second peripheral groove portion.

Accordingly, the casing having the sealing structure of the present invention can be formed in a multi-layer structure. Further, the second joint portion between the second member and the third member can have the same structure as the first joint portion. Accordingly, since a contact portion between the second claw portion and the second reception port serves as a stopper when a pulling force is applied to the second member and the third member, it is possible to prevent a large pulling force from being generated at a portion bonded by the second adhesive layer. Accordingly, since it is possible to prevent the peeling of the second adhesive layer, it is possible to prevent deterioration of sealability of the casing.

The present invention also provides a method of manufacturing a casing including a first member and a second member and having a sealing structure such that one of the first and second members includes a first peripheral groove portion and a first reception port and the other thereof includes a first convex edge portion and a first claw portion, the method including: filling an adhesive into the first peripheral groove portion; inserting a front end of the first convex edge portion into the adhesive filled in the first peripheral groove portion and inserting the first claw portion into the first reception port; and curing the adhesive in a state in which a side surface of the first claw portion opposite to the front end of the first convex edge portion is in contact with an inner wall of the first reception port opposite to a bottom of the first peripheral groove portion.

According to the casing manufacturing method of the present invention, it is possible to manufacture a casing having a sealing structure and preventing deterioration of sealability.

Hereinafter, an embodiment of the present invention will be described with reference to the drawings. The configurations shown in the drawings and the following description are examples and the scope of the present invention is not limited by the drawings or the following description.

Figure 2:
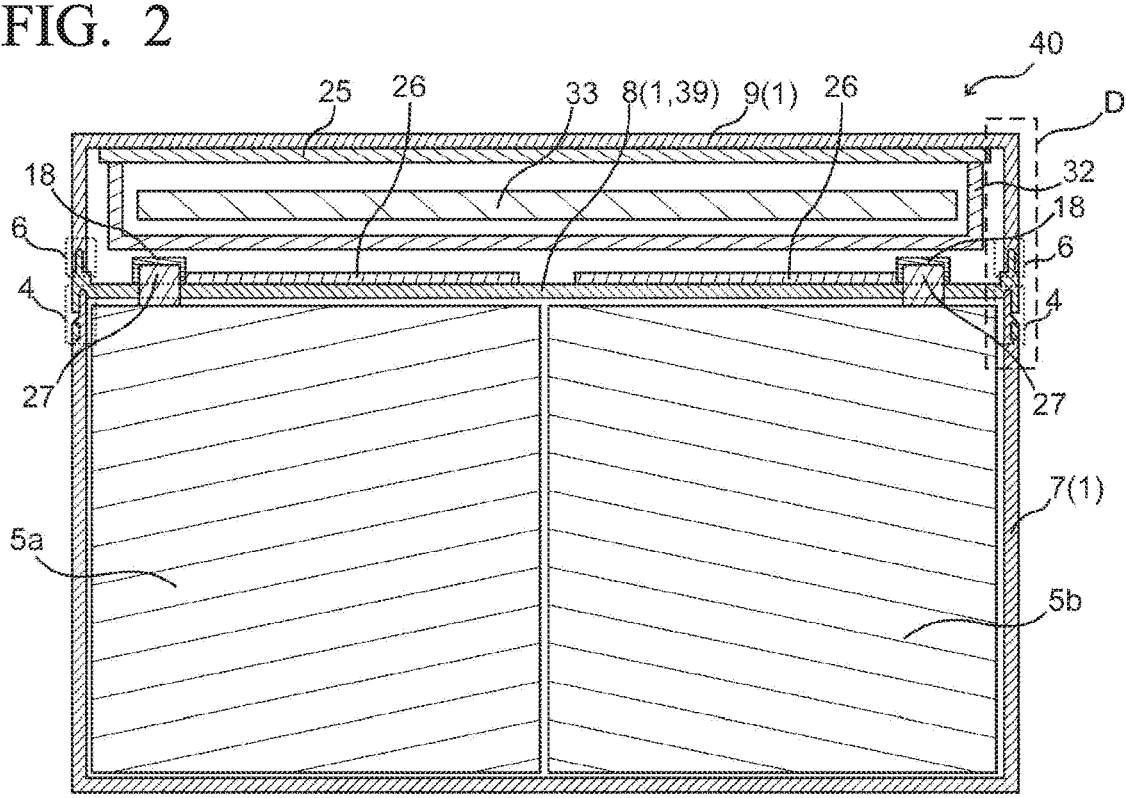
FIG. 2 is a schematic cross-sectional view of the power storage device along a dashed line A-A of FIG. 1.
Figure 3:
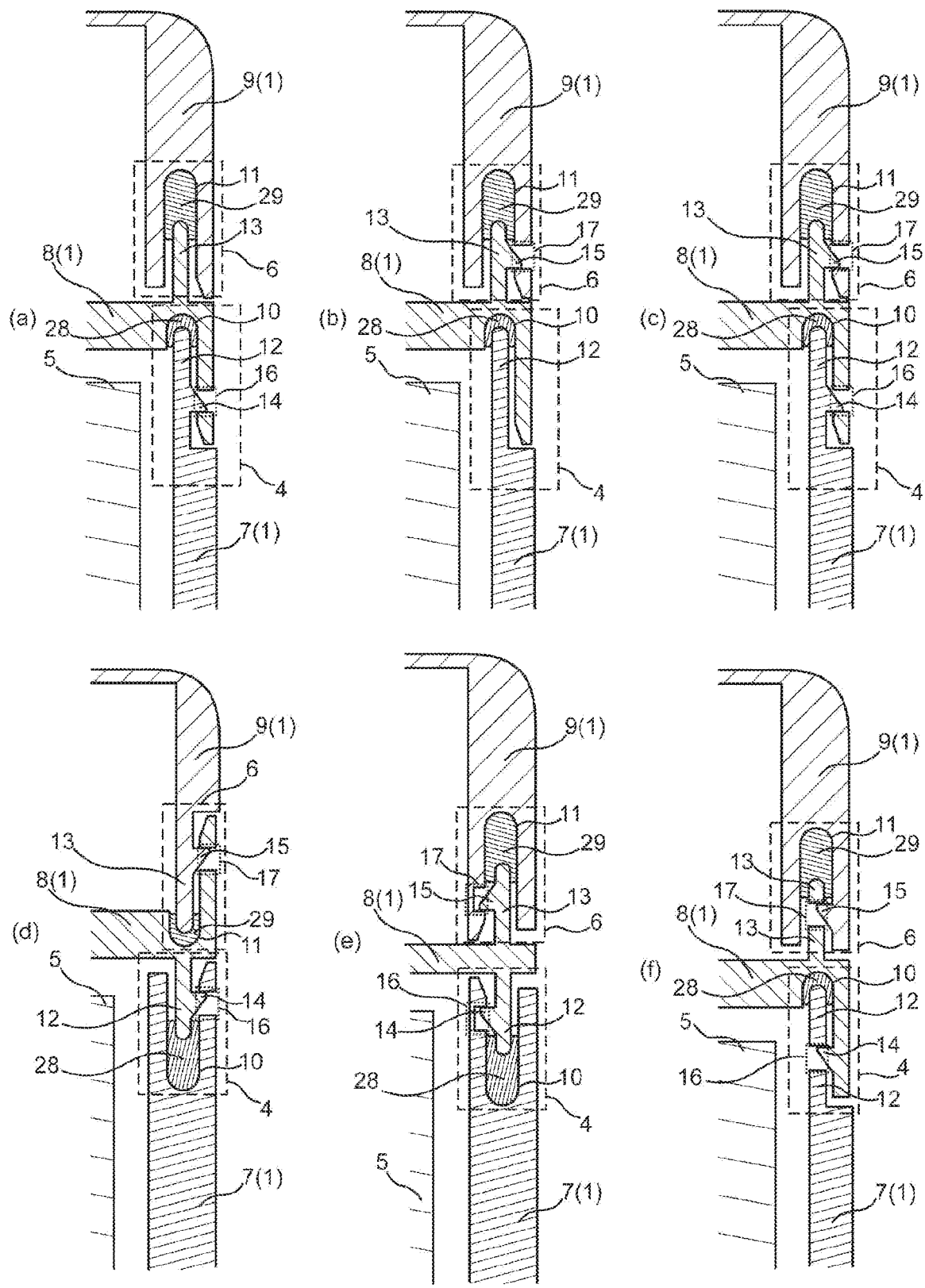
FIG. 3(a) is an enlarged cross-sectional view of a range D surrounded by a dashed line of FIG. 2.
FIG. 3(b) is a partial cross-sectional view of the power storage device along a dashed line B-B of FIG. 1.
FIG. 3(c) is a partial cross-sectional view of the power storage device along a one-dotted chain line C-C of FIG. 1.
FIG. 3(d) is a partial cross-sectional view of a power storage device of a second embodiment of the present invention.
FIG. 3(e) is a partial cross-sectional view of a power storage device of a third embodiment of the present invention.
FIG. 3(f) is a partial cross-sectional view of a power storage device of a fourth embodiment of the present invention.
Figure 4:
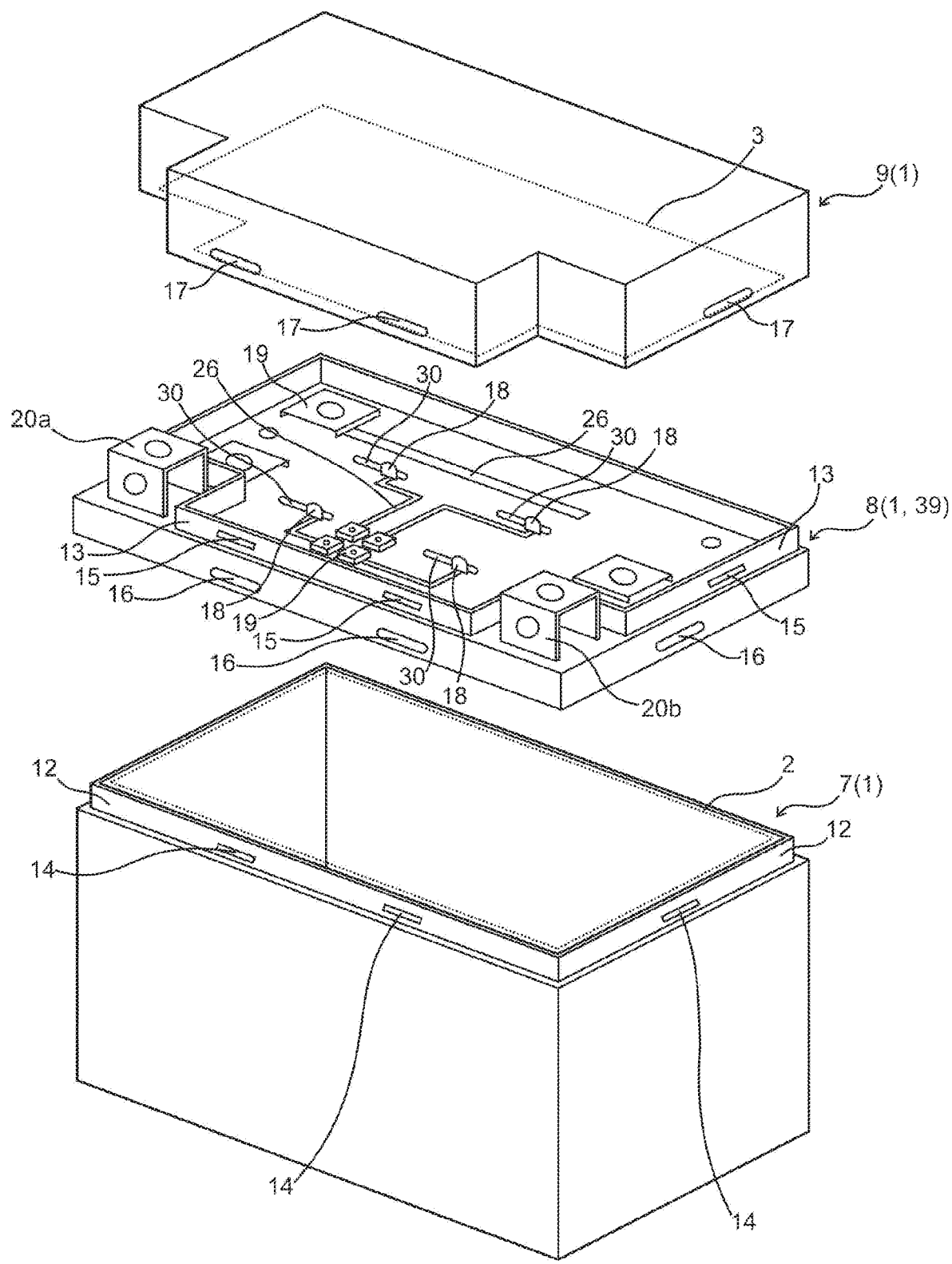
FIG. 4 is an exploded view of a casing included in the power storage device of the first embodiment of the present invention.
Figure 5:
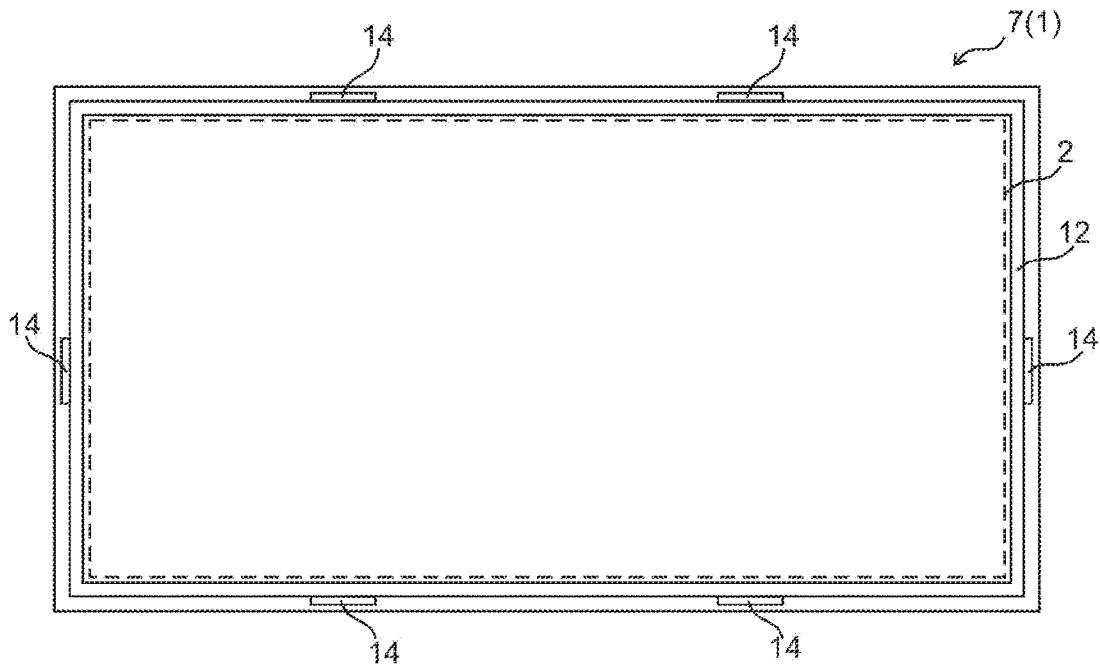
FIG. 5 is a schematic plan view of a first member of the casing included in the power storage device of the first embodiment of the present invention.
Figure 6:
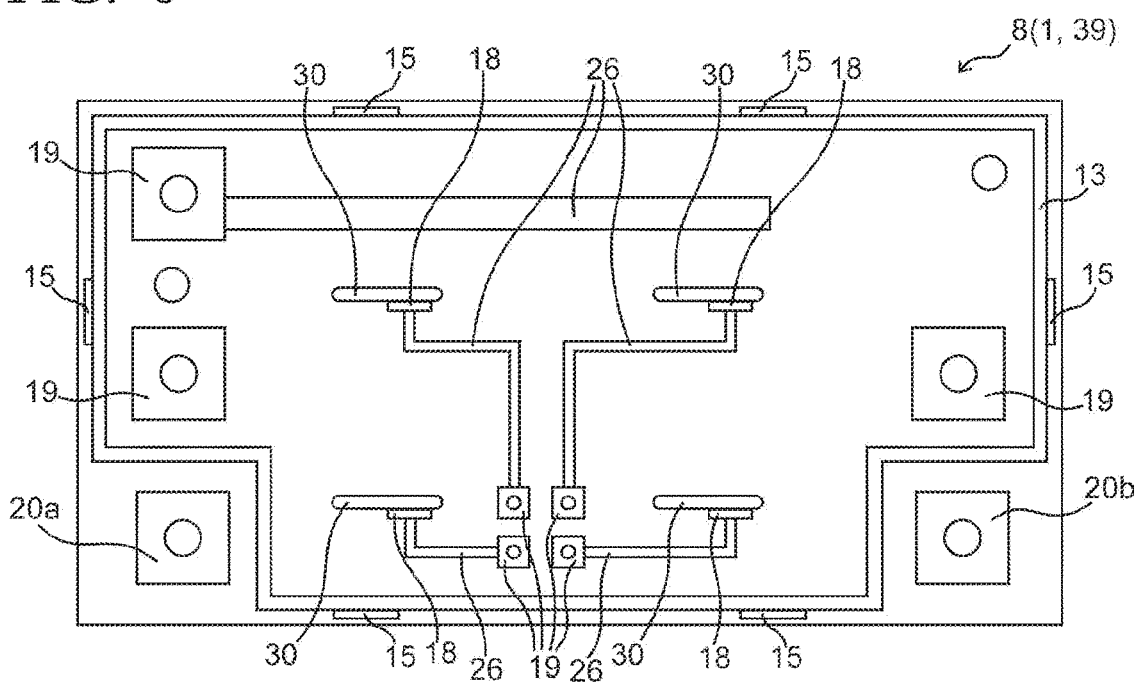
FIG. 6 is a schematic plan view of a second member of the casing included in the power storage device of the first embodiment of the present invention.
Figure 7:
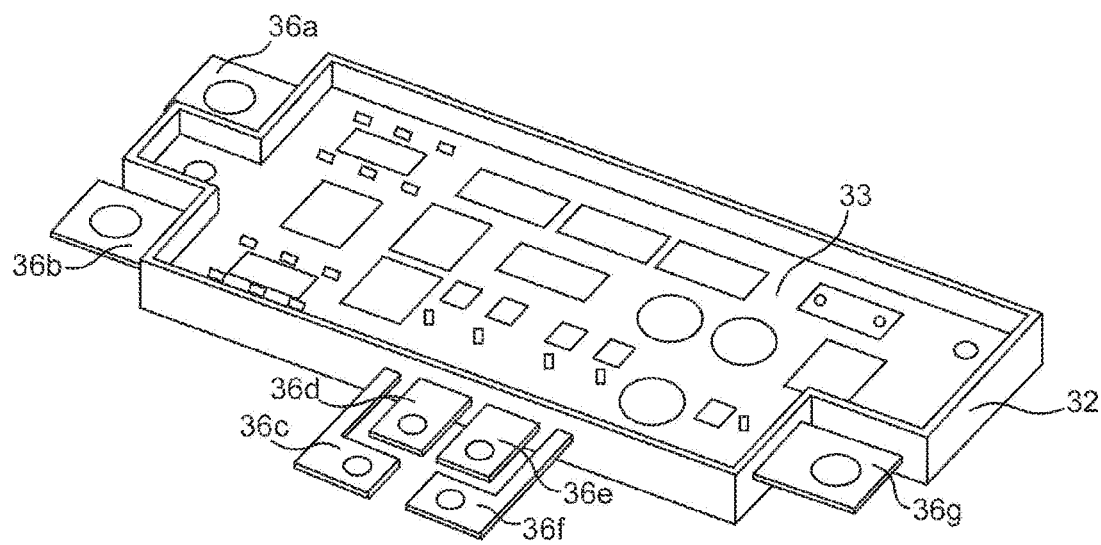
FIG. 7 is a schematic perspective view of a protection casing accommodating a battery monitoring portion included in the power storage device of the first embodiment of the present invention.
Figure 8:
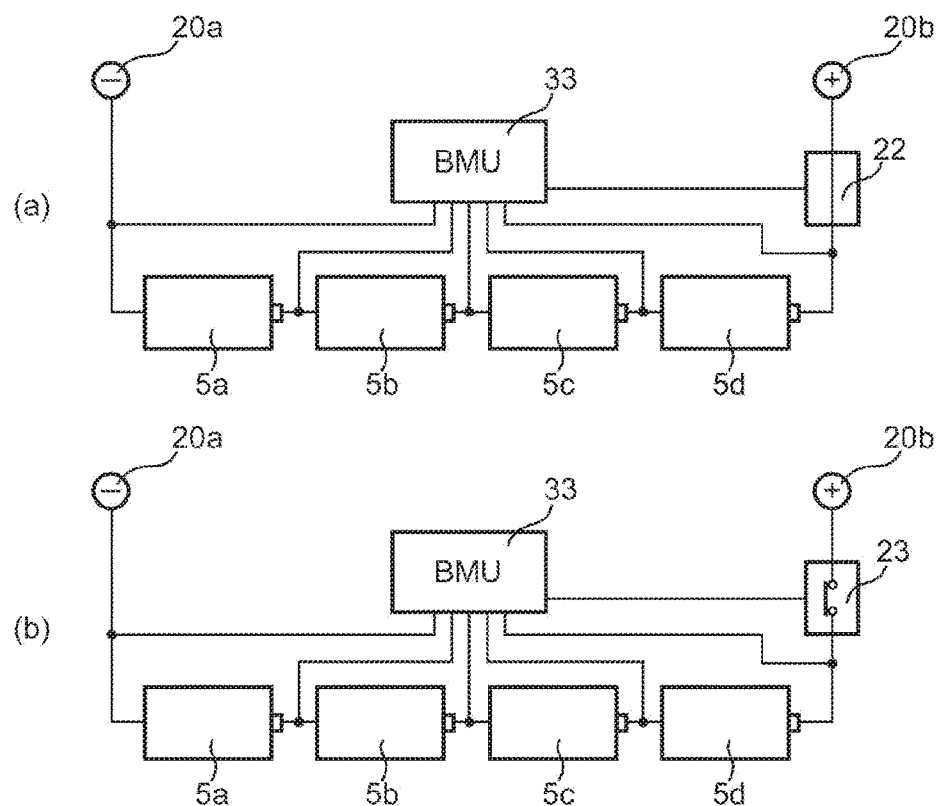
FIGS. 8(a) and 8(b) are schematic circuit diagrams of the power storage device of the first embodiment of the present invention.
Figure 9:
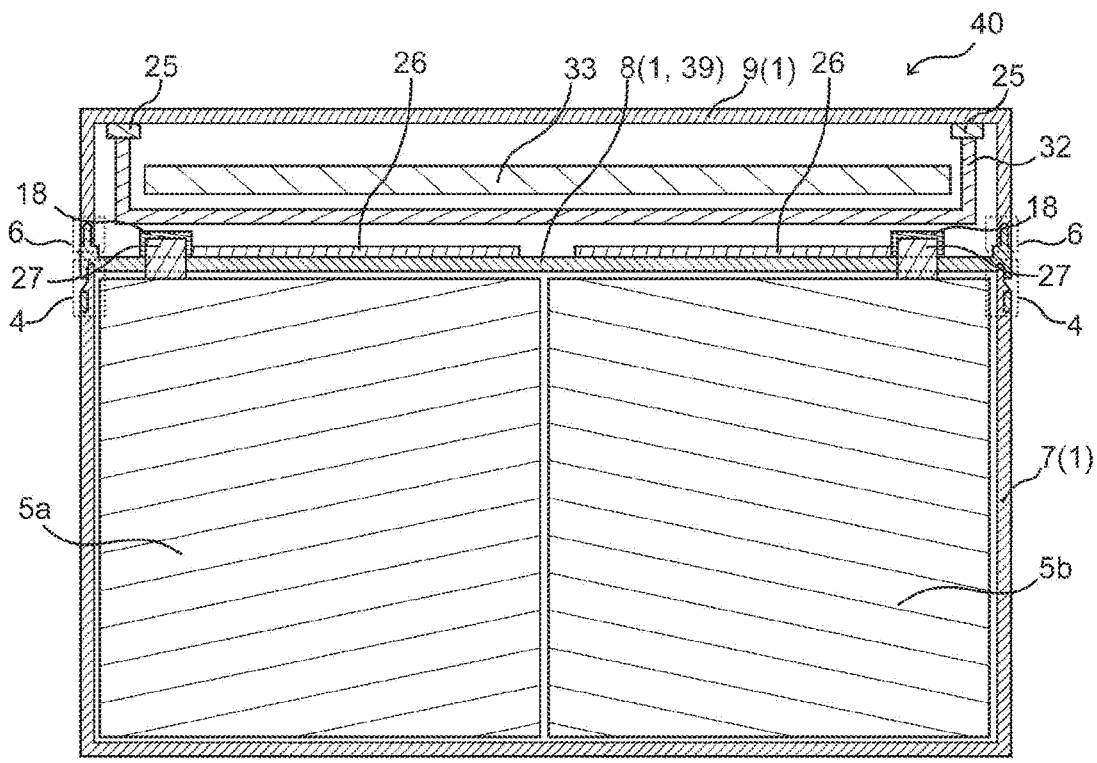
FIG. 9 is a schematic cross-sectional view of a power storage device of a fifth embodiment of the present invention.
Figure 10:
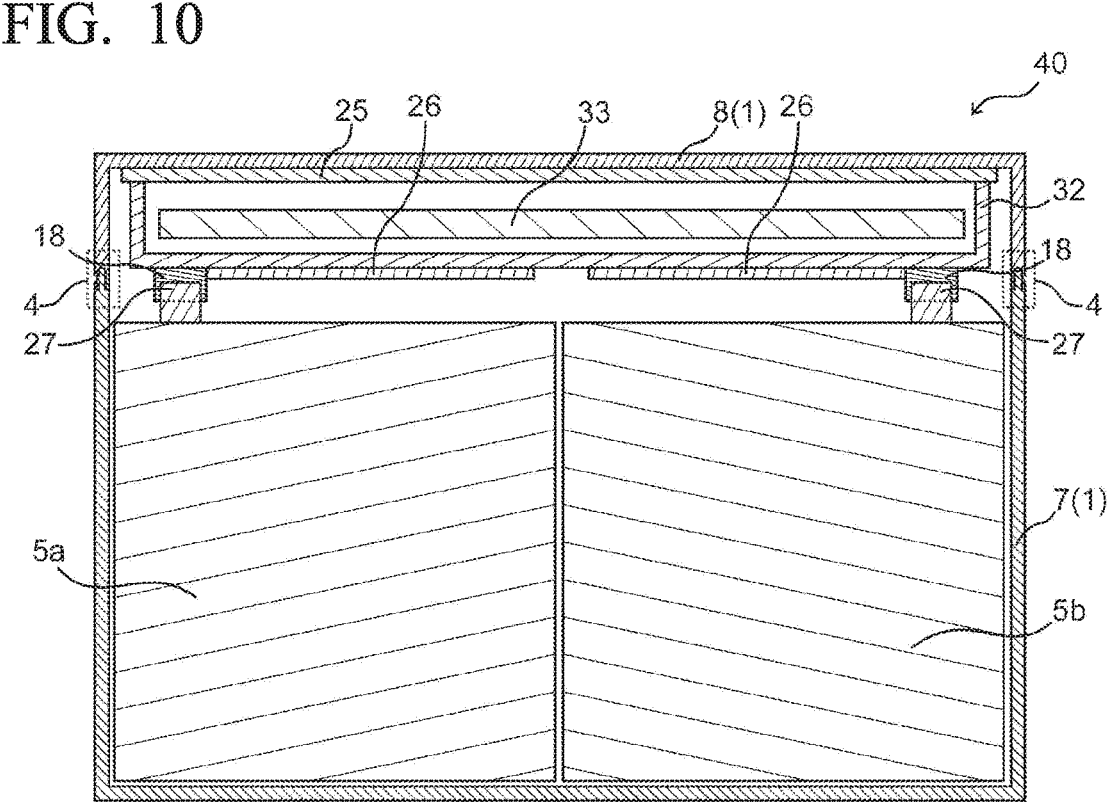
FIG. 10 is a schematic cross-sectional view of a power storage device of a sixth embodiment of the present invention.
Figure 11:
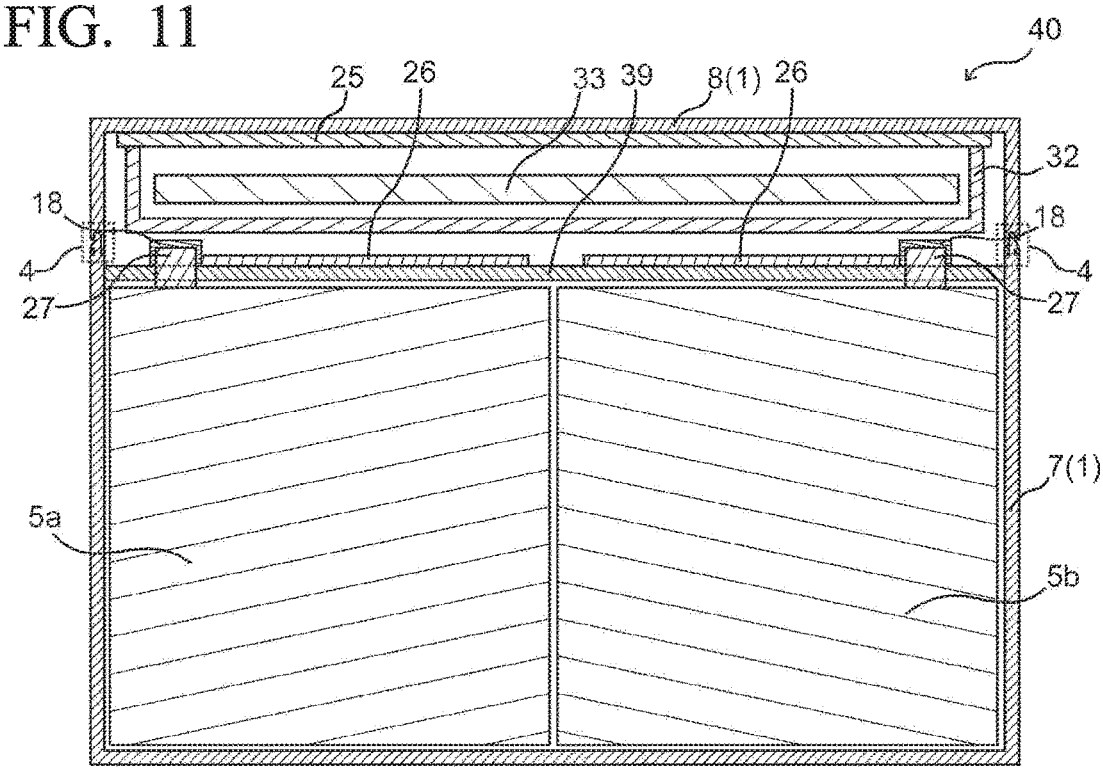
FIG. 11 is a schematic cross-sectional view of a power storage device of a seventh embodiment of the present invention.

Power storage device FIG. 1 is a schematic perspective view of a power storage device of a first embodiment. FIG. 2 is a schematic cross-sectional view of the power storage device along a dashed line A-A of FIG. 1. FIG. 3(a) is an enlarged cross-sectional view of a range D surrounded by a dashed line of FIG. 2, FIG. 3(b) is a partial cross-sectional view of the power storage device along a dashed line B-B of FIG. 1, FIG. 3(c) is a partial cross-sectional view of the power storage device along a one-dotted chain line C-C of FIG. 1, FIG. 3(d) is a partial cross-sectional view of a power storage device of a second embodiment, FIG. 3(e) is a partial cross-sectional view of a power storage device of a third embodiment, and FIG. 3(f) is a partial cross-sectional view of a power storage device of a fourth embodiment. FIG. 4 is an exploded view of a casing included in the power storage device of the first embodiment. FIG. 5 is a schematic plan view of a first member of the casing included in the power storage device of the first embodiment. FIG. 6 is a schematic plan view of a second member of the casing included in the power storage device of the first embodiment. FIG. 7 is a schematic perspective view of a protection casing accommodating a battery monitoring portion included in the power storage device of the first embodiment and FIGS. 8(a) and 8(b) are respective schematic circuit diagrams of the power storage device of the first embodiment. Further, FIGS. 9, 10, and 11 are respective schematic cross-sectional views of power storage devices of fifth, sixth, and seventh embodiments. Additionally, the power storage device of this embodiment includes the power storage devices of the first to seventh embodiments.

A power storage device 40 of this embodiment includes a battery 5 and a casing 1 accommodating the battery 5 and having a sealing structure, the casing 1 includes a first member 7 accommodating the battery 5 and including a first opening 2 and a second member 8 covering the first opening 2, the first member 7 and the second member 8 are joined to each other at a first joint portion 4 provided at a peripheral edge of the first opening 2, the first joint portion 4 includes a first peripheral groove portion 10 and a first reception port 16 provided at one of the first member 7 and the second member 8, a first convex edge portion 12 provided at the other thereof, a first claw portion 14 provided on a side surface of the first convex edge portion 12, and a first adhesive layer 28 disposed in the first peripheral groove portion 10, a front end of the first convex edge portion 12 is disposed in the first peripheral groove portion 10 and is bonded to the inner wall of the first peripheral groove portion 10 by the first adhesive layer 28, the first claw portion 14 is disposed in the first reception port 16, and the first adhesive layer 28 bonds the front end of the first convex edge portion 12 to the inner wall of the first peripheral groove portion 10 in a state in which the side surface of the first claw portion 14 opposite to the front end of the first convex edge portion 12 is in contact with the inner wall of the first reception port 16 opposite to the bottom of the first peripheral groove portion 10 (first to third and fifth to seventh embodiments).

Further, the power storage device 40 of this embodiment includes the battery 5 and the casing 1 accommodating the battery 5 and having the sealing structure, the casing 1 includes the first member 7 accommodating the battery 5 and including the first opening 2 and the second member 8 covering the first opening 2, the first member 7 and the second member 8 are joined to each other at the first joint portion 4 provided at the peripheral edge of the first opening 2, the first joint portion 4 includes the first peripheral groove portion 10 and the first claw portion 14 provided at one of the first member 7 and the second member 8, the first convex edge portion 12 provided at the other thereof, the first reception port 16 provided at the first convex edge portion 12, and the first adhesive layer 28 disposed in the first peripheral groove portion 10, the front end of the first convex edge portion 12 is disposed in the first peripheral groove portion 10 and is bonded to the inner wall of the first peripheral groove portion 10 by the first adhesive layer 28, the first claw portion 14 is disposed in the first reception port 16, and the first adhesive layer 28 bonds the front end of the first convex edge portion 12 to the inner wall of the first peripheral groove portion 10 in a state in which the inner wall of the first reception port 16 near the front end of the first convex edge portion 12 is in contact with the side surface of the first claw portion 14 near the bottom of the first peripheral groove portion 10 (a fourth embodiment).

The power storage device 40 of this embodiment may further include a battery monitoring portion 33 or a protection casing 32. Further, the casing 1 included in the power storage device 40 of this embodiment may further include a third member 9. Further, the second member 8 may be a switchboard.

Hereinafter, the power storage device 40 of this embodiment will be described.

1. Power Storage Device

The power storage device 40 of this embodiment is, for example, a power storage device used in a power source of an automobile, a power source of a motorcycle, a photovoltaic power storage unit, a backup power source, and the like. Further, the power storage device 40 can be provided so as to be chargeable and dischargeable.

2. Battery

The power storage device 40 includes the battery 5 accommodated in the casing 1. The battery 5 includes a positive electrode battery terminal and a negative electrode battery terminal (in the present specification, the positive electrode battery terminal and the negative electrode battery terminal will be referred to as a battery terminal 27). Further, the battery 5 can be accommodated in the first member 7 of the casing 1 so that the positive electrode battery terminal and the negative electrode battery terminal are disposed at the upper side.

Further, the power storage device 40 can include the plurality of batteries 5 accommodated in the casing 1. The plurality of batteries 5 may be connected in parallel or in series to each other. For example, as in the circuit diagrams shown in FIGS. 8(a) and 8(b), the power storage device 40 of the first embodiment includes four batteries 5a to 5d and these batteries 5 are connected in series to each other. Further, the plurality of batteries 5 may be electrically connected to each other by a wire and the battery terminals 27 of two adjacent batteries 5 may be electrically connected to each other by contacting or bonding.

The battery 5 can be a sealed type battery, for example, a lithium ion secondary battery, a sodium ion battery, a nickel-hydrogen secondary battery, a nickel-cadmium secondary battery, or the like. Further, the battery 5 may have a square shape, a cylindrical shape, or a pouch type. Further, the battery 5 can have a structure in which the positive electrode, the negative electrode, and the electrolytic solution are accommodated in the outer package.

3. Casing

The power storage device 40 includes the casing 1 accommodating the battery 5 and having the sealing structure. The casing 1 includes the first member 7 accommodating the battery 5 and including the first opening 2 and the second member 8 covering the first opening 2. For this reason, it is possible to insert the battery 5 into the first member from the first opening 2 at the time of manufacturing and to cover the first opening 2 by the second member 8. Further, the casing 1 can include the third member 9 disposed on the second member 8 and including the second opening 3. The casing 1 may include the first member 7, the second member 8, and the third member 9 as in the power storage device 40 of the first embodiment shown in FIGS. 1 and 2 and may include the first member 7 and the second member 8 as in the power storage device 40 of the sixth embodiment shown in FIG. 10. When the casing 1 includes the first member 7, the second member 8, and the third member 9, the second member 8 can become a switchboard to be described later. The members constituting the casing 1 can be connected to each other so that a sealed space is formed inside the casing 1. Accordingly, since it is possible to prevent water or the like from intruding into the casing 1, it is possible to improve the safety and the durability of the power storage device 40.

Additionally, the material of the casing 1 may be plastic. Accordingly, the casing 1 is formed to be elastically deformable so that the first member 7 and the second member 8 can engage with each other by a snap-fit structure. The material of the casing 1 may be, for example, a polyphenylene sulfide resin.

The first member 7 and the second member 8 are joined to each other at the first joint portion 4 provided at the peripheral edge of the first opening 2. For this reason, it is possible to bond the first member 7 and the second member 8 to each other so that a gap is not formed therebetween. The first joint portion 4 can have, for example, a structure shown in the partially cross-sectional views of FIGS. 3(a) to 3(f). In the first to third and fifth to seventh embodiments, the first joint portion 4 includes the first peripheral groove portion 10 and the first reception port 16 provided at one of the first member 7 and the second member 8, the first convex edge portion 12 provided at the other thereof, the first claw portion 14 provided on the side surface of the first convex edge portion 12, and the first adhesive layer 28 disposed inside the first peripheral groove portion 10. For example, in the power storage device 40 of the first embodiment shown in FIGS. 1, 2, 4 to 6 and FIGS. 3(a) to 3(c), the first convex edge portion 12 and the first claw portion 14 are provided at the first member 7 and the first peripheral groove portion 10 and the first reception port 16 are provided at the second member 8. Further, in the power storage device 40 of the second embodiment shown in FIG. 3(d) and the power storage device 40 shown in the third embodiment of FIG. 3(e), the first convex edge portion 12 and the first claw portion 14 are provided at the second member 8, and the first peripheral groove portion 10 and the first reception port 16 are provided at the first member 7.

In the fourth embodiment, the first joint portion 4 includes the first peripheral groove portion 10 and the first claw portion 14 provided at one of the first member 7 and the second member 8, the first convex edge portion 12 provided at the other thereof, the first reception port 16 provided at the first convex edge portion 12, and the first adhesive layer 28 disposed inside the first peripheral groove portion 10. For example, as in the power storage device 40 shown in FIG. 3(f), the first peripheral groove portion 10 and the first claw portion 14 can be provided at the second member 8 and the first convex edge portion 12 and the first reception port 16 can be provided at the first member 7. Further, the first peripheral groove portion 10 and the first claw portion 14 may be provided at the first member 7 and the first convex edge portion 12 and the first reception port 16 may be provided at the second member 8.

The first convex edge portion 12 can be provided at the first member 7 or the second member 8 as in the wall surrounding the first opening 2. Further, the width of the first convex edge portion 12 can be provided to be narrower than the width of the first peripheral groove portion 10. Accordingly, the front end of the first convex edge portion 12 can be disposed inside the first peripheral groove portion 10. For example, as in the plan view of FIG. 5 and the perspective view of the first member 7 included in the exploded view of FIG. 4, the first convex edge portion 12 can be provided at the first member 7.

In the first to third and fifth to seventh embodiments, the first claw portion 14 is provided on the side surface of the first convex edge portion 12. In the fourth embodiment, the first claw portion 14 is provided at the extension portion of the side wall of the first peripheral groove portion 10. Further, the first claw portion 14 is disposed inside the first reception port 16. Accordingly, the first claw portion 14 and the first reception port 16 can engage with each other. In addition, as in the power storage device 40 of FIGS. 3(a), 3(c), and 3(d), the first claw portion 14 may be provided on the outer side surface of the first convex edge portion 12. As in the power storage device 40 of FIG. 3(e), the first claw portion 14 may be provided on the inner side surface of the first convex edge portion 12. Further, as in FIG. 3(f), the first claw portion 14 may be provided at the extension portion of the outer side wall of the first peripheral groove portion 10 and the first claw portion 14 may be provided at the extension portion of the inner side wall of the first peripheral groove portion 10.

The first claw portion 14 can have a hook shape. Additionally, in the power storage device 40 of the first to seventh embodiments, the cross-section of the first claw portion 14 has a triangular shape, but the cross-section of the first claw portion 14 may have a square shape. Further, the first claw portion 14 may be formed so that the horizontal width is wider than the vertical width.

In the first to third and fifth to seventh embodiments, the first claw portion 14 can have a gradient such that a height is lowered as it moves toward the front end of the first convex edge portion 12. Accordingly, since it is possible to elastically deform the first convex edge portion 12 or a side wall portion 51 of the first reception port 16 by using a gradient when the first member 7 and the second member 8 are combined with each other, the first claw portion 14 and the first reception port 16 can engage with each other by a snap-fit structure. Further, the first claw portion 14 may be provided on the outer peripheral surface of the first convex edge portion 12. Accordingly, it is possible to easily and elastically deform the first convex edge portion 12 or the side wall portion 51 of the first reception port 16.

In the fourth embodiment, the first claw portion 14 can have a gradient such that a height is lowered as it moves away from the bottom of the first peripheral groove portion 10. Accordingly, it is possible to elastically deform the first convex edge portion 12 or the extension portion of the side wall of the first peripheral groove portion 10 when the first member 7 and the second member 8 are combined with each other.

Further, the plurality of first claw portions 14 can be provided at the side surface of the first convex edge portion 12 or the extension portion of the side wall of the first peripheral groove portion 10. Further, the plurality of first claw portions 14 can be provided to surround the first opening 2. Accordingly, the first member 7 and the second member 8 can engage with each other by a plurality of snap-fit structures and thus a stress can be distributed to the plurality of snap-fit structures when a pulling force is applied to the first member 7 and the second member 8. For example, in the power storage device 40 of the first embodiment shown in FIGS. 3(a) to 3(c) and FIGS. 4 and 5, the outer peripheral surface of the first convex edge portion 12 is provided with six first claw portions 14.

The first peripheral groove portion 10 can be provided at the first member 7 or the second member 8 as in a groove surrounding the first opening 2. Further, the width of the first peripheral groove portion 10 can be provided to be wider than the width of the first convex edge portion 12. Further, the shape of the first peripheral groove portion 10 can be a shape in which the entire front end of the first convex edge portion 12 is disposed inside the first peripheral groove portion 10. In the power storage device 40 of the first embodiment, the first peripheral groove portion 10 is provided at the second member 8.

In the first to third and fifth to seventh embodiments, the first reception port 16 is provided at the member provided with the first peripheral groove portion 10 in the first member 7 and the second member 8. Further, the first reception port 16 may be provided at the extension portion of the outer side wall of the first peripheral groove portion 10 or may be provided at the extension portion of the inner side wall of the first peripheral groove portion 10. In the power storage device 40 of the first embodiment shown in FIG. 3(c) and the like, the first reception port 16 is provided at the extension portion of the outer side wall of the first peripheral groove portion 10 of the second member 8. Further, in the power storage device 40 of the third embodiment shown in FIG. 3(e), the first reception port 16 is provided at the extension portion of the inner side wall of the first peripheral groove portion 10 of the first member 7.

In the fourth embodiment, the first reception port 16 is provided at the first convex edge portion 12. For example, the first reception port 16 can be provided as in FIG. 3(f).

The first reception port 16 is provided so that the first claw portion 14 is disposed inside the first reception port 16. Accordingly, the first member 7 and the second member 8 can engage with each other by a snap-fit structure. The shape of the first reception port 16 is not particularly limited as long as the first reception portion 16 can engage with the first claw portion 14. However, the first reception port 16 may be a through-hole as in the first reception port 16 included in, for example, the power storage device 40 of the first embodiment shown in FIGS. 3(a), 3(c), and 4 or may be a groove having a bottom as in the power storage device 40 of the third embodiment shown in FIG. 3(e). It is desirable that the first reception port 16 be a slit-shaped through-hole. Accordingly, when the first member 7 and the second member 8 are combined with each other by a snap-fit structure, the first claw portion 14 can be inserted into the first reception port 16 while the side wall portion of the first reception port 16 is elastically deformed in an arch shape.

Further, in the first to third and fifth to seventh embodiments, the side wall portion of the first reception port 16 may be thinner than the first convex edge portion 12. Accordingly, it is possible to elastically deform the side wall portion 51 while preventing the deformation of the first convex edge portion 12. For this reason, it is possible to prevent the bending of the first convex edge portion 12.

When the first claw portion 14 is provided at a plurality of positions, the first reception port 16 can be provided as many as the first claw portion 14. In the power storage device 40 of the first embodiment shown in FIG. 1 and the like, since the first member 7 is provided with six first claw portions 14, six first reception ports 16 are provided at the second member 8.

The first adhesive layer 28 is disposed in the first peripheral groove portion 10 to bond the front end of the first convex edge portion 12 to the inner wall of the first peripheral groove portion 10. Further, the first adhesive layer 28 can be provided so that the entire front end of the first convex edge portion 12 is bonded.

FIG. 12(a) is a partially cross-sectional view of the power storage device 40 of the second embodiment and FIG. 12(b) is a partially cross-sectional view of a power storage device of a comparative example.

The first adhesive layer 28 included in the power storage devices 40 of the first to third and fifth to seventh embodiments bonds the front end of the first convex edge portion 12 to the inner wall of the first peripheral groove portion 10 in a state where the side surface 43 of the first claw portion 14 opposite to the front end of the first convex edge portion 12 is in contact with the inner wall 46 of the first reception port 16 opposite to the bottom of the first peripheral groove portion 10.

Figure 12:
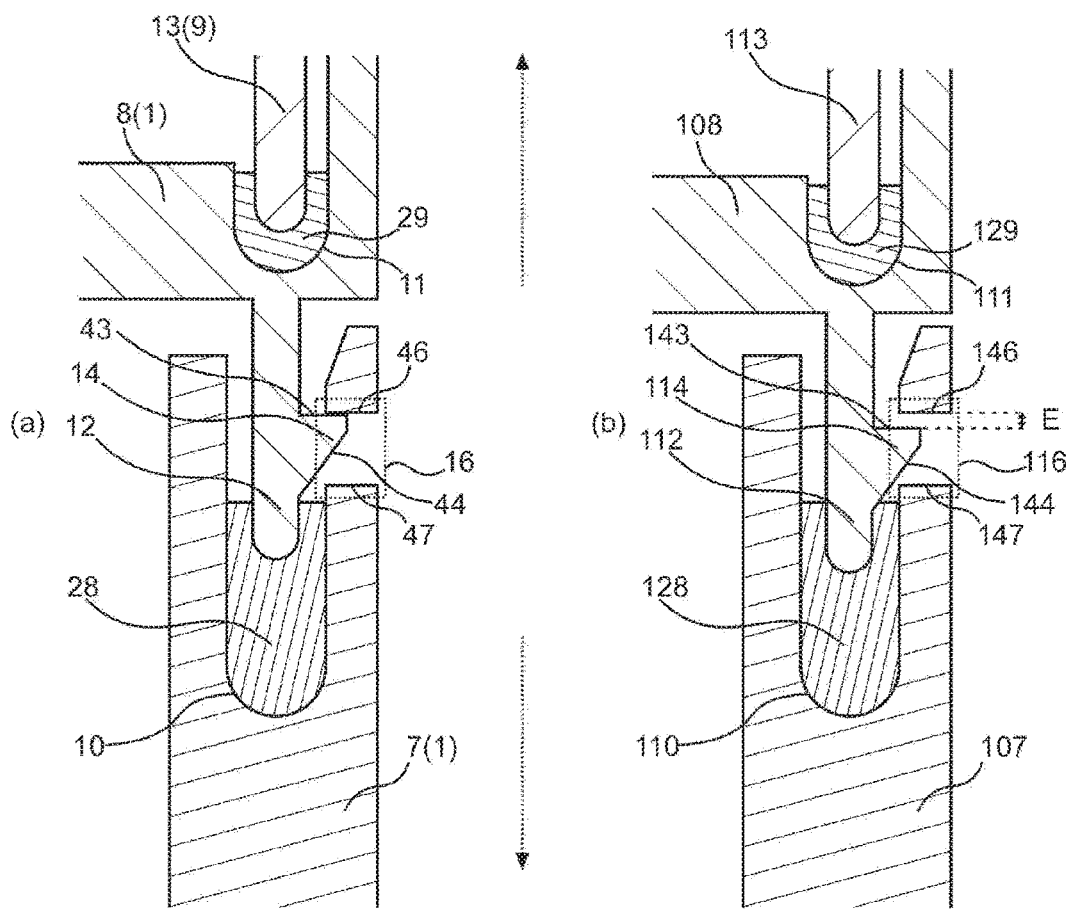
FIG. 12(a) is a partial cross-sectional view of the power storage device of the second embodiment of the present invention and FIG. 12(b) is a partial cross-sectional view of a power storage device of a comparative example.

In the power storage devices 40 of the first to third and fifth to seventh embodiments, when a pulling force is applied to the first member 7 and the second member 8 as indicated by a dotted arrow of FIG. 12, a stress is generated in a contact surface between the side surface 43 of the first claw portion 14 and the inner wall 46 of the first reception port 16 and the contact surface serves as a stopper. Accordingly, it is possible to prevent the first adhesive layer 28 from being peeled from the first convex edge portion 12 or the first member 7.

Further, the first adhesive layer 28 can bond the front end of the first convex edge portion 12 to the inner wall of the first peripheral groove portion 10 in a state where the side surface 44 of the first claw portion 14 near the front end of the first convex edge portion 12 is not in contact with the inner wall 47 of the first reception port 16 near the bottom of the first peripheral groove portion 10.

The first adhesive layer 28 included in the power storage device 40 of the fourth embodiment bonds the front end of the first convex edge portion 12 to the inner wall of the first peripheral groove portion 10 in a state where the inner wall of the first reception port 16 near the front end of the first convex edge portion 12 is in contact with the side surface of the first claw portion 14 near the bottom of the first peripheral groove portion 10.

In the power storage device 40 of the fourth embodiment, when a pulling force is applied to the first member 7 and the second member 8, a stress is generated in a contact surface between the side surface of the first claw portion 14 and the inner wall of the first reception port 16 and the contact surface serves as a stopper. Accordingly, it is possible to prevent the first adhesive layer 28 from being peeled from the first convex edge portion 12 or the second member 8.

Further, the first adhesive layer 28 can bond the front end of the first convex edge portion 12 to the inner wall of the first peripheral groove portion 10 in a state where the inner wall of the first reception port 16 opposite to the front end of the first convex edge portion 12 is not in contact with the side surface of the first claw portion 14 opposite to the bottom of the first peripheral groove portion 10.

Meanwhile, a first adhesive layer 128 included in the power storage device of the comparative example shown in FIG. 12(b) bonds a front end of a first convex edge portion 112 to an inner wall of a first peripheral groove portion 110 in a state where a side surface 143 of a first claw portion 114 opposite to the front end of the first convex edge portion 112 is not in contact with an inner wall 146 of a first reception port 116 opposite to a bottom of the first peripheral groove portion 110. When a first member 107 and a second member 108 are joined to each other by a snap-fit structure, a gap E is formed usually as shown in FIG. 12(b). For this reason, when a pulling force is applied to the first member 107 and the second member 108 as indicated by a dotted arrow of FIG. 12, a large stress is generated in a bonded surface between the first convex edge portion 112 and the first adhesive layer 128 or a bonded surface between the first peripheral groove portion 110 and the first adhesive layer 128 and hence the bonding surface is peeled in some cases.

Figure 13:
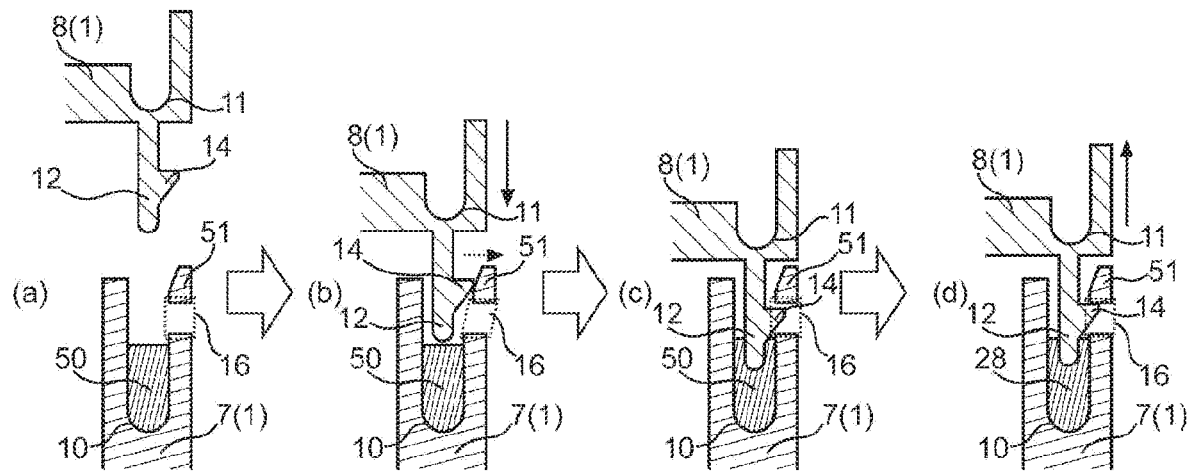
FIG. 13 is an explanatory diagram of a method of manufacturing a casing included in the power storage device of the second embodiment of the present invention.
Figure 14:
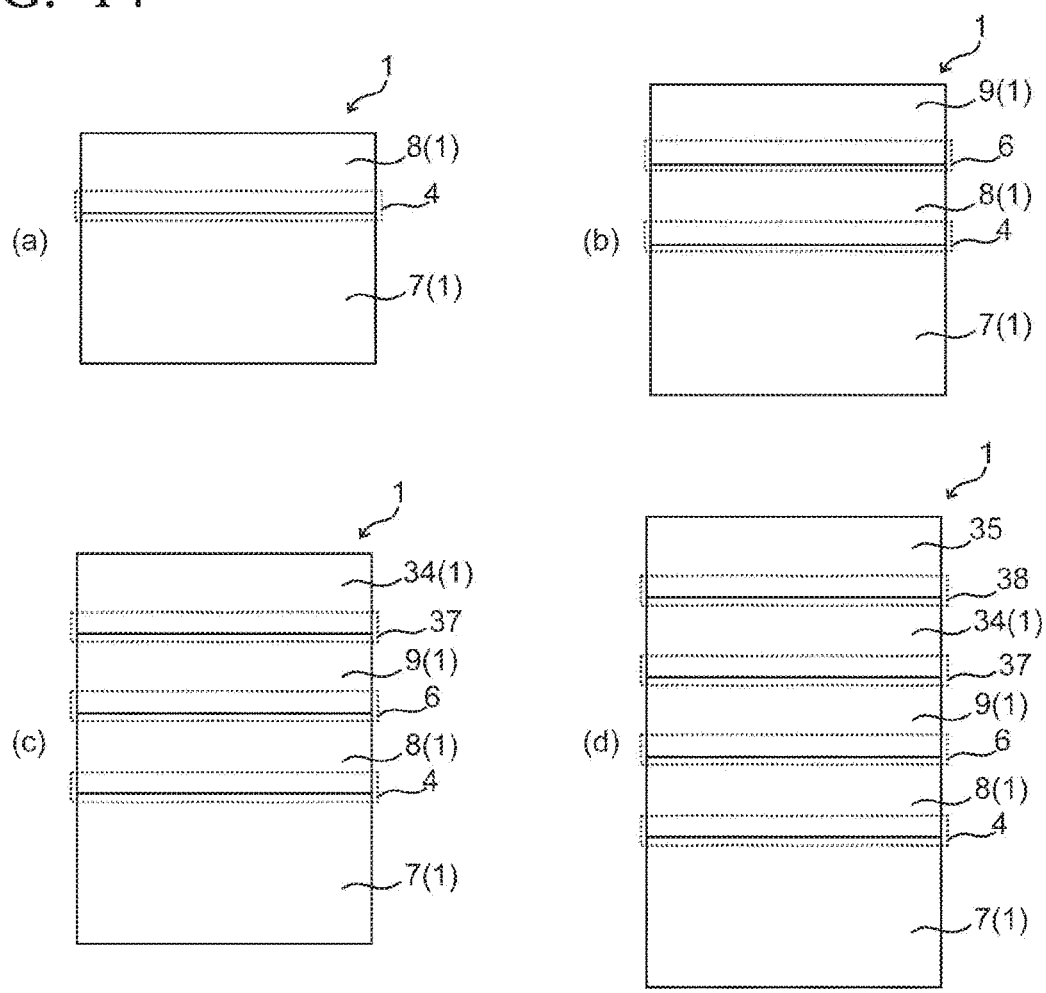
FIGS. 14(a) to 14(d) are respective schematic side views of the casing of the embodiment of the present invention.

FIG. 13 is an explanatory diagram of a method of manufacturing the casing 1 included in the power storage device 40 of the second embodiment.

The method of manufacturing the casing 1 includes a step of filling an adhesive 50 into the first peripheral groove portion 10, a step of inserting the front end of the first convex edge portion 12 into the adhesive 50 filled in the first peripheral groove portion 10 and inserting the first claw portion 14 into the first reception port 16, and a step of curing the adhesive 50 in a state where the side surface 43 of the first claw portion 14 opposite to the front end of the first convex edge portion 12 is in contact with the inner wall 46 of the first reception port 16 opposite to the bottom of the first peripheral groove portion 10.

FIG. 13(a) is a diagram showing the first member 7 and the second member 8 after the adhesive 50 is filled into the first peripheral groove portion 10. Then, when the first convex edge portion 12 is inserted into the first peripheral groove portion 10, the first claw portion 14 contacts the side wall portion 51 of the first reception port 16 of the first member 7 as shown in FIG. 13(b) so that the side wall portion 51 is pressed and widened to be elastically deformed in an arch shape. Then, when the first claw portion 14 reaches the first reception port 16 as shown in FIG. 13(c), the pressed and widened side wall portion 51 returns to an original shape, the first claw portion 14 is inserted into the first reception port 16, and the first member 7 and the second member 8 are locked to each other by a snap-fit structure. Further, the front end of the first convex edge portion 12 is inserted into the adhesive 50.

In this state, the side surface 43 of the first claw portion 14 and the inner wall 46 of the first reception port 16 are not in contact with each other. Then, a force of pulling the second member 8 is applied to the first member 7 as indicated by a solid arrow shown in FIG. 13(d). Then, the adhesive 50 is cured to form the first adhesive layer 28 in a state where the side surface 43 of the first claw portion 14 is in contact with the inner wall 46 of the first reception port 16. Accordingly, it is possible to bond the first member 7 and the second member 8 to each other by the first joint portion 4 in a state where the side surface 43 of the first claw portion 14 is in contact with the inner wall 46 of the first reception port 16. Here, a case in which the side wall portion 51 is elastically deformed has been described, but the first convex edge portion 12 may be elastically deformed inward. Further, the side wall portion 51 may be elastically deformed outward and the first convex edge portion 12 may be elastically deformed inward.

Further, the method of manufacturing the casing 1 is the method of manufacturing the casing 1 including the first member 7 and the second member 8 and having the sealing structure, one of the first member 7 and the second member 8 includes the first peripheral groove portion and the first reception port and the other thereof includes the first convex edge portion and the first claw portion. Here, the method may include a step of filling the adhesive 50 into the first peripheral groove portion 10, a step of inserting the front end of the first convex edge portion 12 into the adhesive 50 filled in the first peripheral groove portion 10 and inserting the first claw portion 14 into the first reception port 16, and a step of curing the adhesive 50 in a state where the inner wall of the first reception port 16 near the front end of the first convex edge portion 12 contacts the side surface of the first claw portion 14 near the bottom of the first peripheral groove portion 10.

For the adhesive 50, for example, a curing agent mixing type adhesive, an ultraviolet curing type adhesive, a moisture curing type adhesive, or the like can be used, but an epoxy resin curing agent mixing type adhesive is desirable.

As a method of applying a force of pulling the second member 8 to the first member 7, for example, a method of applying a pulling force due to the weight of the first member 7 or the second member 8 by hanging one member of the first member 7 and the second member 8 on the other member is exemplified. Further, a pulling force generated by a jig may be applied or a force of mechanically pulling the first member 7 or the second member 8 may be applied.

The casing 1 can include the third member 9 disposed on the second member 8 and including the second opening 3. The second member 8 and the third member 9 are joined to each other at the second joint portion 6 provided at the peripheral edge of the second opening 3. For this reason, the second member 8 and the third member 9 can be joined to each other without forming a gap therebetween. The second joint portion 6 can have, for example, a structure shown in the partially cross-sectional views of FIGS. 3(a) to 3(f).

In the first to third and fifth to seventh embodiments, the second joint portion 6 includes a second peripheral groove portion 11 and a second reception port 17 provided at one of the second member 8 and the third member 9, a second convex edge portion 13 provided at the other thereof, a second claw portion 15 provided on the side surface of the second convex edge portion 13, and a second adhesive layer 29 disposed inside the second peripheral groove portion 11. For example, in the power storage device 40 of the first embodiment shown in FIGS. 1, 2, and 4 to 6 and FIGS. 3(a) to 3(c) and the power storage device 40 of the third embodiment shown in FIG. 3(e), the second convex edge portion 13 and the second claw portion 15 are provided at the second member 8 and the second peripheral groove portion 11 and the second reception port 17 are provided at the third member 9. Further, in the power storage device 40 of the second embodiment shown in FIG. 3(d), the second convex edge portion 13 and the second claw portion 15 are provided at the third member 9 and the second peripheral groove portion 11 and the second reception port 17 are provided at the second member 8.

In the fourth embodiment, the second joint portion 6 includes the second peripheral groove portion 11 and the second claw portion 15 provided at one of the second member 8 and the third member 9, the second convex edge portion 13 provided at the other thereof, the second reception port 17 provided at the second convex edge portion 13, and the second adhesive layer 29 disposed inside the second peripheral groove portion 11. For example, as in the power storage device 40 shown in FIG. 3(f), the second peripheral groove portion 11 and the second claw portion 15 can be provided at the third member 9 and the second convex edge portion 13 and the second reception port 17 can be provided at the second member 8. Further, the second peripheral groove portion 11 and the second claw portion 15 may be provided at the second member 8 and the second convex edge portion 13 and the second reception port 17 may be provided at the third member 9.

The second convex edge portion 13 can be provided at the second member 8 or the third member 9 as in the wall surrounding the second opening 3. Further, the width of the second convex edge portion 13 can be provided to be narrower than the width of the second peripheral groove portion 11. For example, as in the plan view of FIG. 6 and the perspective view of the second member 8 included in the exploded view of FIG. 4, the second convex edge portion 13 can be provided at the second member 8.

In the first to third and fifth to seventh embodiments, the second claw portion 15 is provided on the side surface of the second convex edge portion 13. In the fourth embodiment, the second claw portion 15 is provided at the extension portion of the side wall of the second peripheral groove portion 11. Further, the second claw portion 15 is disposed inside the second reception port 17. Additionally, as in the power storage device 40 of FIGS. 3(a), 3(c), and 3(d), the second claw portion 15 may be provided at the outer side surface of the second convex edge portion 13. Further, as in the power storage device 40 shown in FIG. 3(e), the second claw portion 15 may be provided at the inner side surface of the second convex edge portion 13. Further, as in FIG. 3(f), the second claw portion 15 may be provided at the extension portion of the outer side wall of the second peripheral groove portion 11 and the second claw portion 15 may be provided at the extension portion of the inner side wall of the second peripheral groove portion 11.

The second claw portion 15 can have a hook shape. Additionally, in the power storage devices 40 of the first to seventh embodiments, the cross-section of the second claw portion 15 has a triangular shape, but the cross-section of the second claw portion 15 may have a square shape. Further, the second claw portion 15 may be formed so that the horizontal width is wider than the vertical width.

In the first to third and fifth to seventh embodiments, the second claw portion 15 can have a gradient such that a height is lowered as it moves toward the front end of the second convex edge portion 13. Accordingly, since it is possible to elastically deform the second convex edge portion 13 or the side wall portion of the second reception port 17 by using a gradient when the second member 8 and the third member 9 are combined with each other, the second claw portion 15 and the second reception port 17 can engage with each other by a snap-fit structure. Further, the second claw portion 15 may be provided on the outer peripheral surface of the second convex edge portion 13. Accordingly, it is possible to easily and elastically deform the second convex edge portion 13 or the side wall portion of the second reception port 17.

In the fourth embodiment, the second claw portion 15 can have a gradient such that a height is lowered as it moves away from the bottom of the second peripheral groove portion 11. Accordingly, it is possible to elastically deform the second convex edge portion 13 or the extension portion of the side wall of the second peripheral groove portion 11 when the second member 8 and the third member 9 are combined with each other.

Further, the plurality of second claw portions 15 can be provided at the side surface of the second convex edge portion 13 or the extension portion of the side wall of the second peripheral groove portion 11. Further, the plurality of second claw portions 15 can be provided to surround the second opening 3. Accordingly, since the second member 8 and the third member 9 can engage with each other by a plurality of snap-fit structures, it is possible to distribute a stress to the plurality of snap-fit structures when a pulling force is applied to the second member 8 and the third member 9. For example, in the power storage device 40 of the first embodiment shown in FIGS. 3(a) to 3(c) and FIGS. 4 and 6, six second claw portions 15 are provided on the outer peripheral surface of the second convex edge portion 13.

The second peripheral groove portion 11 can be provided at the second member 8 or the third member 9 as in the groove surrounding the second opening 3. Further, the width of the second peripheral groove portion 11 can be provided to be wider than the width of the second convex edge portion 13. Further, the shape of the second peripheral groove portion 11 can be a shape in which the entire front end of the second convex edge portion 13 is disposed inside the second peripheral groove portion 11. In the power storage device 40 of the first embodiment, the second peripheral groove portion 11 is provided at the third member 9.

In the first to third and fifth to seventh embodiments, the second reception port 17 is provided at the member provided with the second peripheral groove portion 11 in the second member 8 and the third member 9. Further, the second reception port 17 may be provided at the extension portion of the outer side wall of the second peripheral groove portion 11 or the extension portion of the inner side wall of the second peripheral groove portion 11. In the power storage device 40 of the first embodiment shown in FIG. 3(c) and the like, the second reception port 17 is provided at the extension portion of the outer side wall of the second peripheral groove portion 11 of the third member 9. Further, in the power storage device 40 of the third embodiment shown in FIG. 3(e), the second reception port 17 is provided at the extension portion of the inner side wall of the second peripheral groove portion 11 of the third member 9.

In the fourth embodiment, the second reception port 17 is provided at the second convex edge portion 13. For example, as in FIG. 3(f), the second reception port 17 can be provided.

The second reception port 17 is provided so that the second claw portion 15 is disposed inside the second reception port 17. Accordingly, the second member 8 and the third member 9 can engage with each other by a snap-fit structure. The shape of the second reception port 17 is not particularly limited as long as the second reception port 17 can engage with the second claw portion 15. However, for example, as in the second reception port 17 included in the power storage device 40 of the first embodiment shown in FIGS. 3(b), 3(c), and 4, the second reception port 17 may be a through-hole. Then, as in the power storage device 40 of the third embodiment shown in FIG. 3(e), the second reception port 17 may be a groove with a bottom. It is desirable that the second reception port 17 be a slit-shaped through-hole. Accordingly, it is possible to insert the second claw portion 15 into the second reception port 17 by elastically deforming the side wall portion of the second reception port 17 in an arch shape when the second member 8 and the third member 9 are combined with each other by a snap-fit structure. Further, in the first to third and fifth to seventh embodiments, the side wall portion of the second reception port 17 may be thinner than the second convex edge portion 13. Accordingly, it is possible to elastically deform the side wall portion of the second reception port by preventing the deformation of the second convex edge portion 13. For this reason, it is possible to prevent the bending of the second convex edge portion 13.

When the second claw portion 15 is provided at a plurality of positions, the second reception port 17 can be provided as many as the second claw portion 15. In the power storage device 40 of the first embodiment shown in FIG. 1 and the like, since six second claw portions 15 are provided at the second member 8, six second reception ports 17 are provided at the third member 9.

The second adhesive layer 29 is disposed inside the second peripheral groove portion 11 to bond the front end of the second convex edge portion 13 to the inner wall of the second peripheral groove portion 11. Further, the second adhesive layer 29 can be provided so that the entire front end of the second convex edge portion 13 is bonded.

In the first to third and fifth to seventh embodiments, the second adhesive layer 29 bonds the front end of the second convex edge portion 13 to the inner wall of the second peripheral groove portion 11 in a state where the side surface of the second claw portion 15 opposite to the front end of the second convex edge portion 13 is in contact with the inner wall of the second reception port 17 opposite to the bottom of the second peripheral groove portion 11. When a pulling force is applied to the second member 8 and the third member 9, a stress is generated in a contact surface between the side surface of the second claw portion 15 and the inner wall of the second reception port 17 and the contact surface serves as a stopper. Accordingly, it is possible to prevent the peeling of the bonding surface between the second convex edge portion 13 and the second adhesive layer 29.

Further, in the first to third and fifth to seventh embodiments, the second adhesive layer 29 can bond the front end of the second convex edge portion 13 to the inner wall of the second peripheral groove portion 11 in a state where the side surface of the second claw portion 15 near the front end of the second convex edge portion 13 is not in contact with the inner wall of the second reception port 17 near the bottom of the second peripheral groove portion 11.

The second adhesive layer 29 included in the power storage device 40 of the fourth embodiment bonds the front end of the second convex edge portion 13 to the inner wall of the second peripheral groove portion 11 in a state where the inner wall of the second reception port 17 near the front end of the second convex edge portion 13 is in contact with the side surface of the second claw portion 15 near the bottom of the second peripheral groove portion 11.

In the power storage device 40 of the fourth embodiment, when a pulling force is applied to the second member 8 and the third member 9, a stress is generated in the contact surface between the side surface of the second claw portion 15 and the inner wall of the second reception port 17 and the contact surface serves as a stopper. Accordingly, it is possible to prevent the peeling of the bonding surface between the second convex edge portion 13 and the second adhesive layer 29.

Further, the second adhesive layer 29 can bond the front end of the second convex edge portion 13 to the inner wall of the second peripheral groove portion 11 in a state where the inner wall of the second reception port 17 opposite to the front end of the second convex edge portion 13 is not in contact with the side surface of the second claw portion 15 opposite to the bottom of the second peripheral groove portion 11.

Since a method of bonding the second member 8 and the third member 9 to each other by the second adhesive layer 29 is the same as the method of manufacturing the casing 1 described above, a description thereof will be omitted.

Additionally, the casing 1 can be obtained by the free combination of various examples of the first joint portions 4 described above and the second joint portions 6 described above.

4. Switchboard

The power storage device 40 can include a switchboard 39 with a wire 26 electrically connecting the battery 5 and the battery monitoring portion 33 to each other. The switchboard 39 can be disposed between the battery monitoring portion 33 and the battery 5 accommodated in the first member 7. The switchboard 39 may be the second member 8 constituting the casing 1 or a member separated from the casing 1. In the power storage device 40 of the first embodiment shown in FIG. 1 and the like, a switchboard is obtained in which the wire 26 is formed on the second member 8. When a part of the switchboard 39 is formed as a part of the casing 1, an external connection terminal 20 can be provided on the switchboard 39.

In the power storage device 40 of the seventh embodiment shown in FIG. 11, the switchboard 39 is accommodated inside the casing 1 and does not become a part of the casing 1.

Additionally, when the wire 26 is provided in the protection casing 32 as in the power storage device 40 shown in FIG. 10, the switchboard 39 can be omitted. Further, when the battery 5 and the battery monitoring portion 33 are connected to each other by an electrical cord, the switchboard 39 can be omitted.

The switchboard 39 can include a battery side wiring terminal 18 connected to the battery terminal 27 of the battery 5. The battery terminal 27 and the battery side wiring terminal 18 may be connected to each other by ultrasonic welding or may be connected to each other by a bolt and a nut. Accordingly, the wire 26 and the battery terminal 27 can be connected to each other. Further, the switchboard 39 may include a slit 30 through which the battery terminal 27 penetrates. Further, the battery side wiring terminal 18 can be provided adjacently to the slit 30. Further, the battery terminal 27 and the battery side wiring terminal 18 can be connected to each other at a position opposite to the battery 5 of the switchboard 39. Accordingly, since the battery terminal 27 of the battery 5 disposed below the switchboard 39 can penetrate the slit 30 of the switchboard 39 and can be joined to the battery side wiring terminal 18, the battery 5 and the switchboard 39 can be directly connected to each other.

Additionally, when the first member 7 accommodates the plurality of batteries 5, the slit 30 and the battery side wiring terminal 18 can be provided at a plurality of positions so that the battery terminal 27 of each battery 5 is electrically connected to the switchboard 39.

When the second member 8 becomes the switchboard 39, the second member 8 can include a negative electrode external connection terminal 20a and a positive electrode external connection terminal 20b (in the present specification, the negative electrode external connection terminal 20a and the positive electrode external connection terminal 20b are referred to as the external connection terminal 20). Further, the external connection terminal 20 can be electrically connected to the battery side wiring terminal 18 through the wire 26. Accordingly, the battery 5 can be charged or discharged through the external connection terminal 20. Further, a part of the wire 26 between the external connection terminal 20 and the battery side wiring terminal 18 may be embedded in the switchboard 39. Accordingly, the external connection terminal 20 and the battery side wiring terminal 18 can be electrically connected to each other in a state where a sealed space is formed inside the casing 1.

The power storage device 40 can include a fuse 22 or a relay 23 in the wire electrically connecting the external connection terminal 20 and the battery side wiring terminal 18 to each other. Further, the fuse 22 or the relay 23 can be provided to disconnect the electrical connection between the external connection terminal 20 and the battery side wiring terminal 18 by a signal from the battery monitoring portion 33. The fuse 22 or the relay 23 may be provided in the switchboard 39 or may be provided inside the protection casing 32. The fuse 22 or the relay 23 can be provided, for example, as in the circuit diagrams of FIGS. 8(*a*) and 8(*b*).

The switchboard 39 can include a battery monitoring portion side wiring terminal 19. The battery monitoring portion side wiring terminal 19 can be connected to a connection terminal 36 of the protection casing 32. Accordingly, the battery 5 and the battery monitoring portion 33 can be electrically connected to each other.

Additionally, the battery side wiring terminal 18 and the battery monitoring portion side wiring terminal 19 can be provided at a plurality of positions to monitor the voltage of each battery 5 of the battery monitoring portion 33. For example, the battery side wiring terminal 18 and the battery monitoring portion side wiring terminal 19 can be provided to form an electric circuit as in the circuit diagrams shown in FIGS. 8(*a*) and 8(*b*).

5. Battery Monitoring Portion

The battery monitoring portion 33 is a portion which monitors the battery 5. The battery monitoring portion 33 is, for example, an electronic circuit board having electronic components mounted thereon. The battery monitoring portion 33 may be a part of the electronic circuit board. The battery monitoring portion 33 may include a plurality of the electronic circuit boards. Further, the battery monitoring portion 33 is accommodated in the protection casing 32. The battery monitoring portion 33 can be electrically connected to the battery 5, the fuse 22, the relay 23, or the external connection terminal 20. Accordingly, the battery can be monitored by the battery monitoring portion 33. For example, as in the circuit diagrams shown in FIGS. 8(*a*) and 8(*b*), the battery monitoring portion 33 and the battery 5 can be electrically connected to each other.

The battery monitoring portion 33 can be provided to measure the voltage of each battery 5. Further, the battery monitoring portion 33 can be provided to detect the overcharge based on the voltage measurement result of the battery 5. Further, the battery monitoring portion 33 can be provided to output a signal for interrupting the connection between the battery 5 and the external connection terminal 20 by the fuse 22 or the relay 23 when the overcharge of at least one battery 5 is detected. Accordingly, since it is possible to forcedly interrupt the current when the overcharge occurs in at least one battery 5, it is possible to improve the safety of the power storage device 40.

The battery monitoring portion 33 may be provided to detect over discharge of the battery 5, to measure the temperature inside the casing 1, or to detect the overcurrent. Further, the battery monitoring portion 33 can be provided to keep the balance of the voltages of the plurality of batteries 5 accommodated in the first member 7. Accordingly, since it is possible to reduce the damage of the battery 5 caused by the unbalance of the voltage of the plurality of batteries 5, it is possible to improve the durability of the power storage device 40. Additionally, the battery monitoring portion 33 can have a balancer corresponding to the batteries 5.

6. Protection Casing

The protection casing 32 is a casing which accommodates the battery monitoring portion 33 and is accommodated in the casing 1 to form a sealed space therein. For this reason, a space for accommodating the battery 5 inside the casing 1 can be separated from a space for accommodating the battery monitoring portion 33. With this configuration, even when a liquid leakage occurs in the battery 5, the leaking electrolytic solution does not intrude into the protection casing 32 accommodating the battery monitoring portion 33. Accordingly, it is possible to prevent the damage of the battery monitoring portion 33. For this reason, it is possible to improve the safety of the power storage device 40. The protection casing 32 is, for example, a plastic casing.

As in the power storage device 40 of the first embodiment shown in FIG. 2 and the like, the sealed space for disposing the battery monitoring portion 33 therein may form the protection casing 32 and a seal member 25. Further, as in the power storage device 40 of the fifth embodiment shown in FIG. 9, the sealed space may include the protection casing 32, the seal member 25, and the casing 1, may include the protection casing 32 and the casing 19, or may include only the protection casing 32. The seal member 25 is, for example, a rubber sheet. The seal member 25 may be provided to cover the opening of the protection casing 32 as in the power storage device 40 of the first embodiment shown in FIG. 2 and the like or may be provided between the side wall of the protection casing 32 and the casing 1 as in the power storage device 40 of the fifth embodiment shown in FIG. 9. Further, the seal member 25 may be sandwiched between the protection casing 32 and the casing 1. Accordingly, the seal member 25, the protection casing 32, and the casing 1 can be brought into close contact with each other so that a sealed space can be formed inside the protection casing 32. Further, for example, the protection casing 32 and the casing 1 may be bonded to each other by an adhesive so that a sealed space is formed inside the protection casing 32.

The protection casing 32 can include the connection terminal 36 at the outside of the protection casing 32. The connection terminal 36 is electrically connected to the battery monitoring portion 33. Further, a part of the wire between the connection terminal 36 and the battery monitoring portion 33 may be embedded in the protection casing 32. Accordingly, the connection terminal 36 and the battery monitoring portion 33 can be electrically connected to each other in a state where a sealed space is formed inside the protection casing 32. Further, the protection casing 32 can include a plurality of connection terminals 36. Accordingly, since the battery monitoring portion 33 can be electrically connected to the wire between the batteries 5 and the wire between the battery 5 and the external connection terminal 20, the battery monitoring portion 33 can monitor the voltage of each battery 5. For example, the protection casing 32 shown in FIG. 7 includes seven connection terminals 36 of 6*a* to 6*g*. For example, the connection terminal 36 can be provided to form a circuit as in the circuit diagrams shown in FIGS. 8(*a*) and 8(*b*). The connection terminal 36 is connected to the battery monitoring portion side wiring terminal 19 of the switchboard 39. Accordingly, the battery monitoring portion 33 and the battery 5 can be electrically connected to each other through the wire 26.

Sealing Structure of Casing

In the sealing structure of the casing 1 of the first embodiment, the casing 1 includes the first member 7 including the first opening 2 and the second member 8 covering the first opening 2, the first member 7 and the second member 8 are joined to each other at the first joint portion 4 provided at the peripheral edge of the first opening 2, the first joint portion 4 includes the first peripheral groove portion 10 and the first reception port 16 provided at one of the first member 7 and the second member 8, the first convex edge portion 12 provided at the other thereof, the first claw portion 14 provided on the side surface of the first convex edge portion 12, and the first adhesive layer 28 disposed inside the first peripheral groove portion 10, the front end of the first convex edge portion 12 is disposed inside the first peripheral groove portion 10 and is bonded to the inner wall of the first peripheral groove portion 10 by the first adhesive layer 28, the first claw portion 14 is disposed inside the first reception port 16, and the first adhesive layer 28 bonds the front end of the first convex edge portion 12 to the inner wall of the first peripheral groove portion 10 in a state where the side surface of the first claw portion 14 opposite to the front end of the first convex edge portion 12 is in contact with the inner wall of the first reception port 16 opposite to the bottom of the first peripheral groove portion 10.

Further, in the sealing structure of the casing 1 of the second embodiment, the casing 1 includes the first member 7 including the first opening 2 and the second member 8 covering the first opening 2, the first member 7 and the second member 8 are joined to each other at the first joint portion 4 provided at the peripheral edge of the first opening 2, the first joint portion 4 includes the first peripheral groove portion 10 and the first claw portion 14 provided at one of the first member 7 and the second member 8, the first convex edge portion 12 provided at the other thereof, the first reception port 16 provided at the first convex edge portion 12, and the first adhesive layer 28 disposed inside the first peripheral groove portion 10, the front end of the first convex edge portion 12 is disposed inside the first peripheral groove portion 10 and is bonded to the inner wall of the first peripheral groove portion 10 by the first adhesive layer 28, the first claw portion 14 is disposed inside the first reception port 16, and the first adhesive layer 28 bonds the front end of the first convex edge portion 12 to the inner wall of the first peripheral groove portion 10 in a state where the inner wall of the first reception port 16 near the front end of the first convex edge portion 12 is in contact with the side surface of the first claw portion 14 near the bottom of the first peripheral groove portion 10.

The casing 1 of this embodiment may be the casing 1 included in the above power storage device 40 or the casing 1 of another device. Further, a description of the casing 1 included in the above power storage device 40 also applies to the casing 1 of this embodiment as long as there is no inconsistency. Additionally, the casing 1 of this embodiment includes the casing 1 of the first embodiment and the casing 1 of the second embodiment.

The casing 1 can include the third member 9 disposed on the second member 8 and including the second opening 3. The second member 8 and the third member 9 are joined to each other at the second joint portion 6 provided at the peripheral edge of the second opening 3, the second joint portion 6 includes the second peripheral groove portion 11 and the second reception port 17 provided at one of the second member 8 and the third member 9, the second convex edge portion 13 provided at the other thereof, the second claw portion 15 provided on the side surface of the second convex edge portion 13, and the second adhesive layer 29 disposed inside the second peripheral groove portion 11, the front end of the second convex edge portion 13 is disposed inside the second peripheral groove portion 11 and is bonded to the inner wall of the second peripheral groove portion 11 by the second adhesive layer 29, the second claw portion 15 is disposed inside the second reception port 17, and the second adhesive layer 29 may bond the front end of the second convex edge portion 13 to the inner wall of the second peripheral groove portion 11 in a state where the side surface of the second claw portion 15 opposite to the front end of the second convex edge portion 13 is in contact with the inner wall of the second reception port 17 opposite to the bottom of the second peripheral groove portion 11.

Further, the second member 8 and the third member 9 are joined to each other at the second joint portion 6 provided at the peripheral edge of the second opening 3, the second joint portion 6 includes the second peripheral groove portion 11 and the second claw portion 15 provided at one of the second member 8 and the third member 9, the second convex edge portion 13 provided at the other thereof, the second reception port 17 provided at the second convex edge portion 13, and the second adhesive layer 29 disposed inside the second peripheral groove portion 11, the front end of the second convex edge portion 13 is disposed inside the second peripheral groove portion 11 and is bonded to the inner wall of the second peripheral groove portion 11 by the second adhesive layer 29, the second claw portion 15 is disposed inside the second reception port 17, and the second adhesive layer 29 may bond the front end of the second convex edge portion 13 to the inner wall of the second peripheral groove portion 11 in a state where the inner wall of the second reception port 17 near the front end of the second convex edge portion 13 is in contact with the side surface of the second claw portion 15 near the bottom of the second peripheral groove portion 11.

Additionally, the first member 7 and the second member 8 can be joined to each other at the first joint portion 4 as in FIGS. 3(a) to 3(f) and FIG. 12(a). Further, the second member 8 and the third member 9 can be joined to each other at the second joint portion 6 as in FIGS. 3(a) to 3(f). Since a description of FIGS. 3 and 12 has been made above, a description thereof will be omitted herein. Further, the casing 1 having the sealing structure of this embodiment can be manufactured as in FIG. 13. Since a description of FIG. 13 has been made above, a description thereof will be omitted herein.

FIGS. 14(a) to 14(d) are schematic side views of the casing 1 of this embodiment. The sealing structure of the casing 1 of this embodiment may be a structure in which the first member 7 and the second member 8 are joined to each other at the first joint portion 4 as in FIG. 14(a) or a structure in which the first member 7 and the second member 8 are joined to each other at the first joint portion 4 and the second member 8 and the third member 9 are joined to each other at the second joint portion 6 as in FIG. 14(b). Further, the casing 1 of this embodiment may include a fourth member 34 as in FIG. 14(c) and the third member 9 and the fourth member 34 can be joined to each other at the third joint portion 37. Additionally, the third joint portion 37 can have the same structure as those of the first joint portion 4 and the second joint portion 6. In addition, the casing 1 of this embodiment may include a fifth member 35 as in FIG. 14(d) and the fourth member 34 and the fifth member 35 can be joined to each other at the fourth joint portion 38. Additionally, the fourth joint portion 38 can have the same structure as those of the first joint portion 4 and the second joint portion 6.

Further, the sealing structure of the casing 1 of this embodiment can have a structure in which a plurality of members overlap each other and the adjacent members can be joined to each other by the same structure as those of the first joint portion 4 and the second joint portion 6. Further, the number of stages of the sealing structure of the casing 1 of this embodiment is not particularly limited.

BRIEF DESCRIPTION OF THE REFERENCE SYMBOLS

1: Casing
2: First opening
3: Second opening
4: First joint portion
5, 5a, 5b, 5c, 5d: Battery
6: Second joint portion
7, 107: First member
8, 108: Second member
9: Third member
10, 110: First peripheral groove portion
11, 111: Second peripheral groove portion
12, 112: First convex edge portion
13, 113: Second convex edge portion
14, 114: First claw portion
15: Second claw portion
16, 116: First reception port
17: Second reception port
18: Battery side wiring terminal
19: Battery monitoring portion side wiring terminal
20, 20a, 20b: External connection terminal
22: Fuse
23: Relay
25: Seal member
26: Wire
27: Battery terminal
28, 128: First adhesive layer
29, 129: Second adhesive layer
30: Slit
32: Protection casing
33: Battery monitoring portion
34: Fourth member
35: Fifth member
36, 36a, 36b, 36c, 36d, 36e, 36f, 36g: Connection terminal
37: Fourth joint portion
38: Fourth joint portion
39: Switchboard
40: Power storage device
43, 143: Side surface of first claw portion opposite to front end of first convex edge portion
44, 144: Side surface of first claw portion of front end side of first convex edge portion
46, 146: Inner wall of first reception port opposite to bottom of first peripheral groove portion
47, 147: Inner wall of first reception port of bottom side of first peripheral groove portion
50: Adhesive
51: Side wall portion of first reception port

What is claim is:

1. A power storage device comprising:
a battery; and
a casing which accommodates the battery and has a sealing structure, wherein the casing comprises a first member accommodating the battery and including a first opening and a second member covering the first opening, wherein the first and second members are joined to each other at a first joint portion provided at a peripheral edge of the first opening,
wherein the first joint portion comprises:
a first peripheral groove portion,
a first reception port provided at one of the first and second members,
a first convex edge portion provided at an other of the first and second members,
a first claw portion provided on a side surface of the first convex edge portion, and
a first adhesive layer disposed inside the first peripheral groove portion, wherein a front end of the first convex edge portion is disposed inside the first peripheral groove portion and is bonded to an inner wall of the first peripheral groove portion by the first adhesive layer,
wherein the first claw portion is disposed inside the first reception port, and
wherein, to maintain a seal of the sealing structure during application of a force to the sealing structure, the first adhesive layer bonds the front end of the first convex edge portion to the inner wall of the first peripheral groove portion in a state in which a side surface of the first claw portion opposite to the front end of the first convex edge portion is in contact with an inner wall of the first reception port opposite to a bottom of the first peripheral groove portion.

2. The power storage device according to claim 1, wherein the first adhesive layer bonds the front end of the first convex edge portion to the inner wall of the first peripheral groove portion in a state in which the side surface of the first claw portion of the front end of the first convex edge portion is not in contact with the inner wall of the first reception port near the bottom of the first peripheral groove portion.

3. A power storage device comprising:
a battery; and
a casing which accommodates the battery and has a sealing structure, wherein the casing comprises:
a first member accommodating the battery, and
a first opening and a second member covering the first opening, wherein the first and second members are joined to each other at a first joint portion provided at a peripheral edge of the first opening,
wherein the first joint portion comprises:
a first peripheral groove portion and a first claw portion provided at one of the first and second members, and
a first convex edge portion provided at an other of the first and second members,
a first reception port provided at the first convex edge portion, and
a first adhesive layer disposed inside the first peripheral groove portion, wherein, to maintain a seal of the sealing structure during application of a force to the sealing structure, a front end of the first convex edge portion is disposed inside the first peripheral groove portion and is bonded to an inner wall of the first peripheral groove portion by the first adhesive layer, wherein the first claw portion is disposed inside the first reception port, and wherein the first adhesive layer bonds the front end of the first convex edge portion to the inner wall of the first peripheral groove portion in a state in which an inner wall of the first reception port near the front end of the first convex edge portion is in contact with a side surface of the first claw portion near a bottom of the first peripheral groove portion.

4. The power storage device according to claim 3, wherein the first claw portion has a hook shape and engages with the first reception port by a snap-fit structure.

5. The power storage device according to claim 3, wherein the first reception port is provided at a plurality of positions of one of the first and second members and the first claw portion is provided at a plurality of positions of the other thereof, and wherein each of the first claw portions is disposed inside any one of the first reception ports among the plurality of first reception ports.

6. The power storage device according to claim 3, wherein the first reception port is a slit-shaped through-hole.

7. The power storage device according to claim 3, wherein the casing further comprises a third member disposed on the second member and including a second opening, wherein the second and third members are joined to each other at a second joint portion provided at a peripheral edge of the second opening, wherein the second joint portion includes a second peripheral groove portion and a second reception port provided at one of the second and third members, a second convex edge portion provided at an other of the second and third members, a second claw portion provided on a side surface of the second convex edge portion, and a second adhesive layer disposed inside the second peripheral groove portion, wherein a front end of the second convex edge portion is disposed inside the second peripheral groove portion and is bonded to an inner wall of the second peripheral groove portion by the second adhesive layer, wherein the second claw portion is disposed inside the second reception port, and wherein the second adhesive layer bonds the front end of the second convex edge portion to the inner wall of the second peripheral groove portion in a state in which a side surface of the second claw portion opposite to the front end of the second convex edge portion is in contact with an inner wall of the second reception port opposite to a bottom of the second peripheral groove portion.

8. The power storage device according to claim 7, wherein the second adhesive layer bonds the front end of the second convex edge portion to the inner wall of the second peripheral groove portion in a state in which the side surface of the second claw portion near the front end of the second convex edge portion is not in contact with the inner wall of the second reception port near the bottom of the second peripheral groove portion.

9. The power storage device according to claim 3, wherein the casing further comprises a third member disposed on the second member and including a second opening, wherein the second and third members are joined to each other at a second joint portion provided at a peripheral edge of the second opening, wherein the second joint portion comprises:
a second peripheral groove portion,
a second claw portion provided at one of the second and third members,
a second convex edge portion provided at an other of the second and third members,
a second reception port provided at the second convex edge portion, and
a second adhesive layer disposed inside the second peripheral groove portion, wherein a front end of the second convex edge portion is disposed inside the second peripheral groove portion and is bonded to an inner wall of the second peripheral groove portion by the second adhesive layer, wherein the second claw portion is disposed inside the second reception port, and wherein the second adhesive layer bonds the front end of the second convex edge portion to the inner wall of the second peripheral groove portion in a state in which an inner wall of the second reception port near the front end of the second convex edge portion is in contact with a side surface of the second claw portion near a bottom of the second peripheral groove portion.

10. The power storage device according to claim 7, further comprising:
a battery monitoring portion which monitors the battery; and
a wire which connects the battery to the battery monitoring portion, wherein the battery monitoring portion is disposed between the second member and the third member, and wherein the wire is disposed on the second member.

11. The power storage device according to claim 10, further comprising a protection casing which accommodates the battery monitoring portion.

12. The power storage device according to claim 3, wherein the first member accommodates a plurality of batteries, and wherein the plurality of batteries are connected to each other in series or in parallel.

13. A sealing structure of a casing comprising:
a first member including a first opening, and
a second member covering the first opening, wherein the first and second members are joined to each other at a first joint portion provided at a peripheral edge of the first opening, wherein, to maintain a seal of the sealing structure during application of a force to the sealing structure, the first joint portion comprises:
a first peripheral groove portion, and
a first reception port provided at one of the first and second members, and a first convex edge portion provided at an other of the first and second members,
a first claw portion provided on a side surface of the first convex edge portion, and
a first adhesive layer disposed inside the first peripheral groove portion, wherein a front end of the first convex edge portion is disposed inside the first peripheral groove portion and is bonded to an inner wall of the first peripheral groove portion by the first adhesive layer, wherein the first claw portion is disposed inside the first reception port, and wherein the first adhesive layer bonds the front end of the first convex edge portion to the inner wall of the first peripheral groove portion in a state in which a side surface of the first claw portion opposite to the front end of the first convex edge portion is in contact with an inner wall of the first reception port opposite to a bottom of the first peripheral groove portion.

14. The sealing structure according to claim 13, wherein the casing further comprises a third member disposed on the second member and including a second opening, wherein the second and third members are joined to each other at a second joint portion provided at a peripheral edge of the second opening, wherein the second joint portion comprises:
a second peripheral groove portion,
a second reception port provided at one of the second and third members, a second convex edge portion provided at an other of the second and third members, a second claw portion provided on a side surface of the second convex edge portion, and a second adhesive layer disposed inside the second peripheral groove portion, wherein a front end of the second convex edge portion is disposed inside the second peripheral groove portion and is bonded to an inner wall of the second peripheral groove portion by the second adhesive layer, wherein the second claw portion is disposed inside the second reception port, and wherein the second adhesive layer bonds the front end of the second convex edge portion to the inner wall of the second peripheral groove portion in a state in which a side surface of the second claw portion opposite to the front end of the second convex edge portion is in contact with an inner wall of the second reception port opposite to a bottom of the second peripheral groove portion.

15. A method of manufacturing a casing including a first member and a second member and having a sealing structure such that one of the first and second members includes a first peripheral groove portion and a first reception port and the other thereof includes a first convex edge portion and a first claw portion, the method comprising:

filling an adhesive into the first peripheral groove portion; and maintaining a seal of the sealing structure during application of a force to the sealing structure by:

inserting a front end of the first convex edge portion into the adhesive filled in the first peripheral groove portion;

inserting the first claw portion into the first reception port; and curing the adhesive in a state in which a side surface of the first claw portion opposite to the front end of the first convex edge portion is in contact with an inner wall of the first reception port opposite to a bottom of the first peripheral groove portion.

* * * * *